United States Patent
Yumiba et al.

(10) Patent No.: US 6,891,788 B2
(45) Date of Patent: May 10, 2005

(54) OPTICAL DISK, AND METHOD AND APPARATUS FOR REPRODUCING INFORMATION RECORDED IN OPTICAL DISK

(75) Inventors: Takashi Yumiba, Kyoto (JP); Teruyuki Takizawa, Osaka (JP); Mitsuro Moriya, Nara (JP); Mitsuaki Oshima, Kyoto (JP); Akihiko Nishioka, Osaka (JP); Koichi Morioka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/615,853

(22) Filed: Jul. 10, 2003

(65) Prior Publication Data

US 2004/0008596 A1 Jan. 15, 2004

Related U.S. Application Data

(62) Division of application No. 09/677,595, filed on Oct. 3, 2000, now Pat. No. 6,661,768.

(30) Foreign Application Priority Data

Oct. 13, 1999 (JP) ......................................... P11-290664

(51) Int. Cl.[7] ................................................. G11B 7/00
(52) U.S. Cl. ................................ 369/53.21; 369/275.4; 369/47.21; 369/47.19
(58) Field of Search .......................... 369/53.21, 47.19, 369/47.21, 275.4, 275.1, 47.12

(56) References Cited

U.S. PATENT DOCUMENTS

| | | | |
|---|---|---|---|
| 5,541,904 A | 7/1996 | Fite et al. | ................. 369/53.21 |
| 5,761,301 A | 6/1998 | Oshima et al. | ............. 369/272 |
| 5,807,640 A | 9/1998 | Ueno et al. | ............... 369/275.1 |
| 5,815,484 A | 9/1998 | Smith et al. | ............. 369/275.2 |
| 5,818,812 A | 10/1998 | Moribe et al. | ........... 369/47.15 |
| 5,881,038 A | 3/1999 | Oshima et al. | ........... 369/47.12 |
| 6,052,465 A | 4/2000 | Gotoh et al. | ............. 369/53.21 |
| 6,070,799 A | 6/2000 | Ashe | ....................... 369/47.12 |

FOREIGN PATENT DOCUMENTS

| | | |
|---|---|---|
| CN | 1173942 | 2/1998 |
| EP | 0 802 527 | 10/1997 |
| EP | 0 807 929 | 11/1997 |
| EP | 0 932 147 | 7/1999 |
| JP | 61-178732 | 8/1986 |
| JP | 7-85574 | 3/1995 |
| JP | 8-55430 | 2/1996 |
| WO | 96/16401 | 5/1996 |

*Primary Examiner*—David L. Ometz
*Assistant Examiner*—J. L. Ortiz Criado
(74) *Attorney, Agent, or Firm*—Wenderoth, Lind & Ponack, L.L.P.

(57) ABSTRACT

An optical disk is provided for recording data of a signal modulated according to a predetermined modulation method in a form of concavo-convex pits. The optical disk includes a first area having a reflecting film partly removed, and a second area for recording pits which are different from pits satisfying requirements of the predetermined modulation method. The first area having the reflecting film partly removed includes a portion which is formed by removing the reflecting film, and has a length longer than a maximum pit length determined by the modulation method in a circumferential direction of the optical disk. When the pits recorded on the optical disk are physically copied as they are, physical copying of the optical disk can be prevented by utilizing such a difference that the authorized optical disk differs from a pirated copy in a combination of the respective reproduced signals of the first and second areas.

2 Claims, 16 Drawing Sheets

FIRST PREFERRED EMBODIMENT
PLANAR STRUCTURE OF OPTICAL DISK 1

SECTIONAL STRUCTURE OF OPTICAL DISK 1

SECTIONAL STRUCTURE OF FIRST AREA 2

ENLARGED VIEW OF SECOND AREA 3

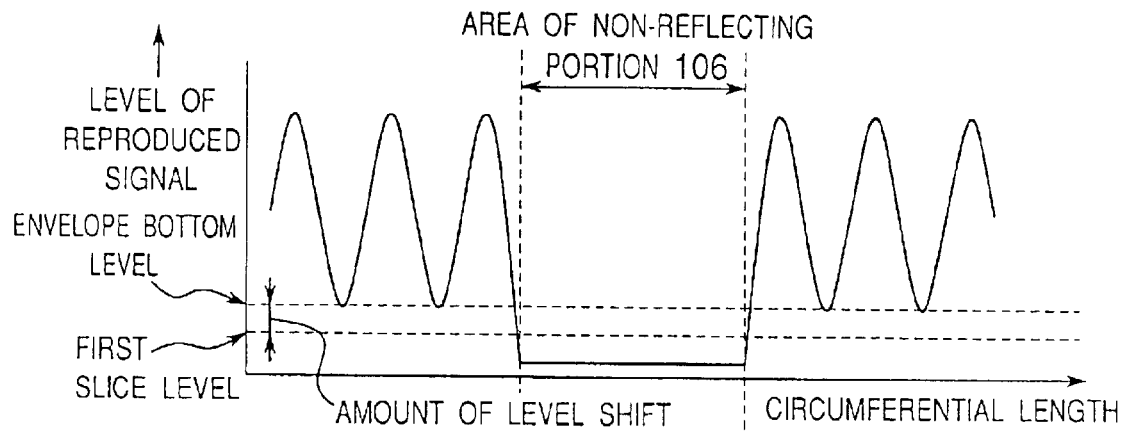
Fig.6A SIGNAL WAVEFORM OF REPRODUCED SIGNAL AT LOW DEGREE OF MODULATION
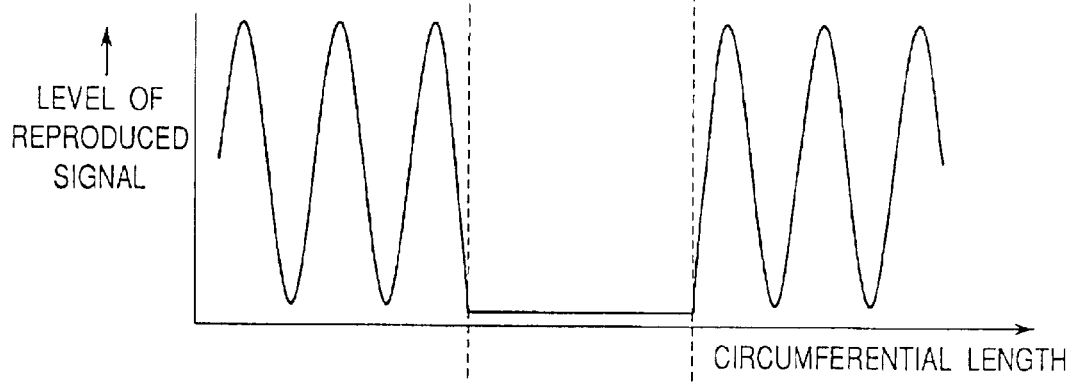
Fig.6B SIGNAL WAVEFORM OF REPRODUCED SIGNAL AT HIGH DEGREE OF MODULATION
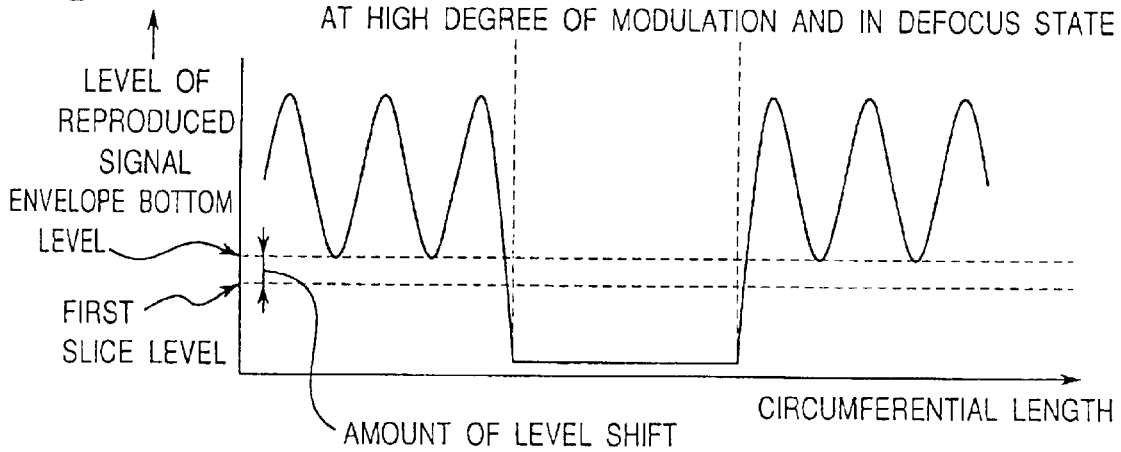
Fig.6C SIGNAL WAVEFORM OF REPRODUCED SIGNAL AT HIGH DEGREE OF MODULATION AND IN DEFOCUS STATE FIRST AREA DETECTING CIRCUIT 23a Fig.8
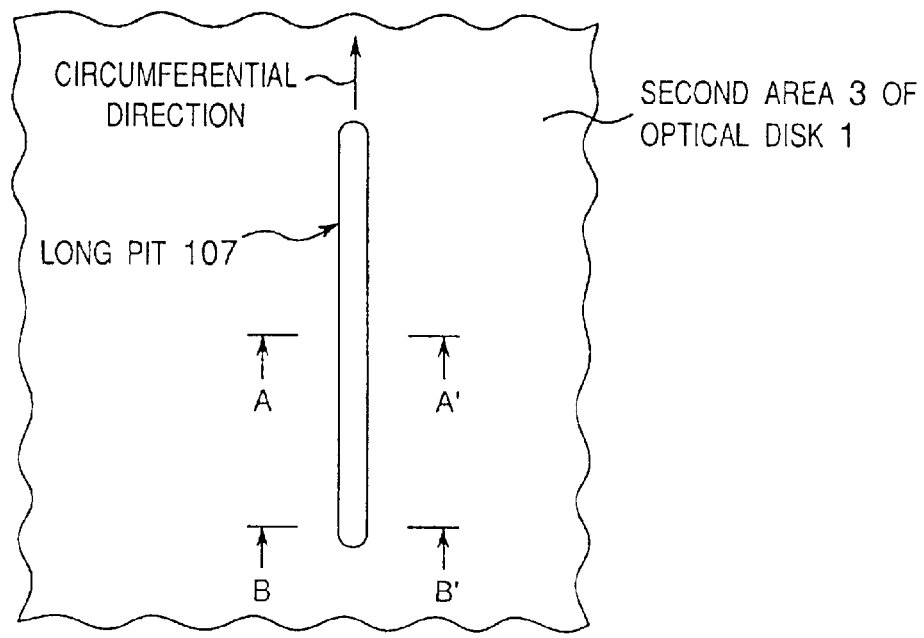
Fig.9A CROSS SECTION IN THE CENTER OF LONG PIT 107 (TAKEN ALONG LINE A-A' OF Fig.8)
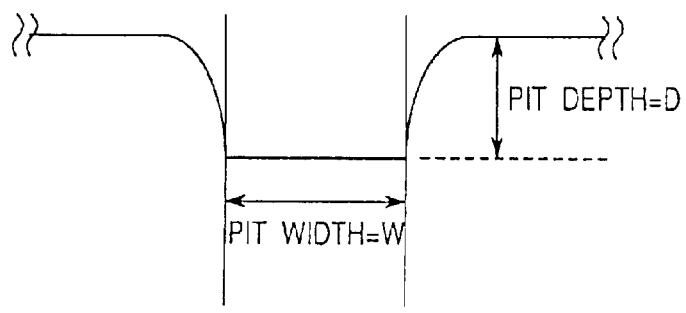
Fig.9B CROSS SECTION IN THE END PORTION OF LONG PIT 107 (TAKEN ALONG LINE B-B' OF Fig.8)
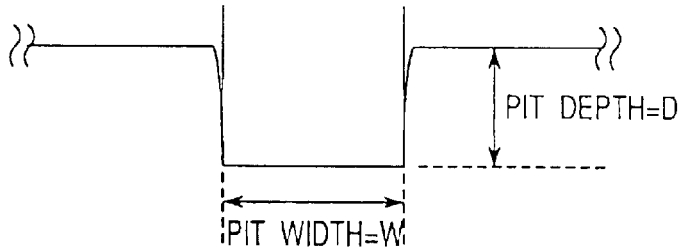

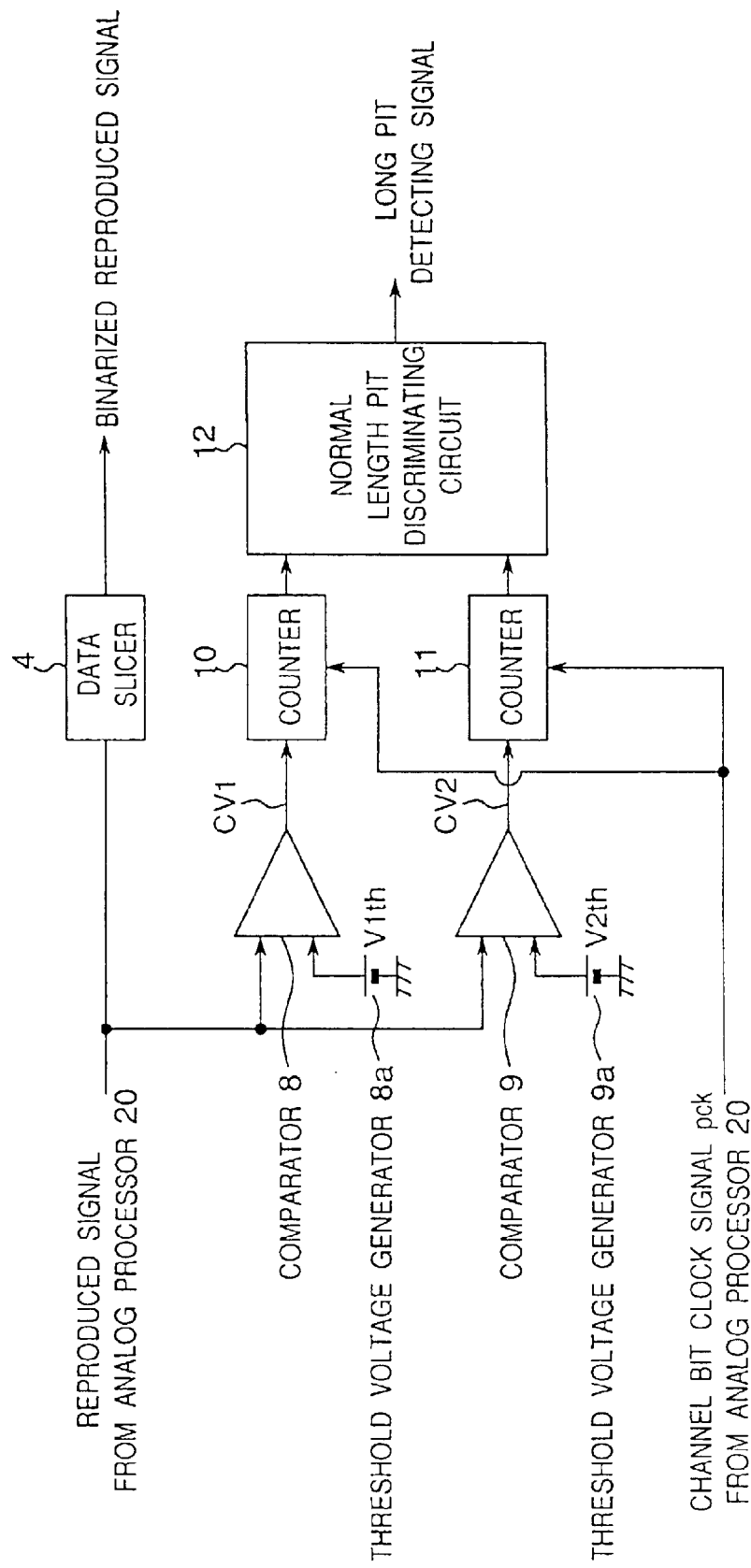
Fig. 10 SECOND AREA DETECTING CIRCUIT 24a

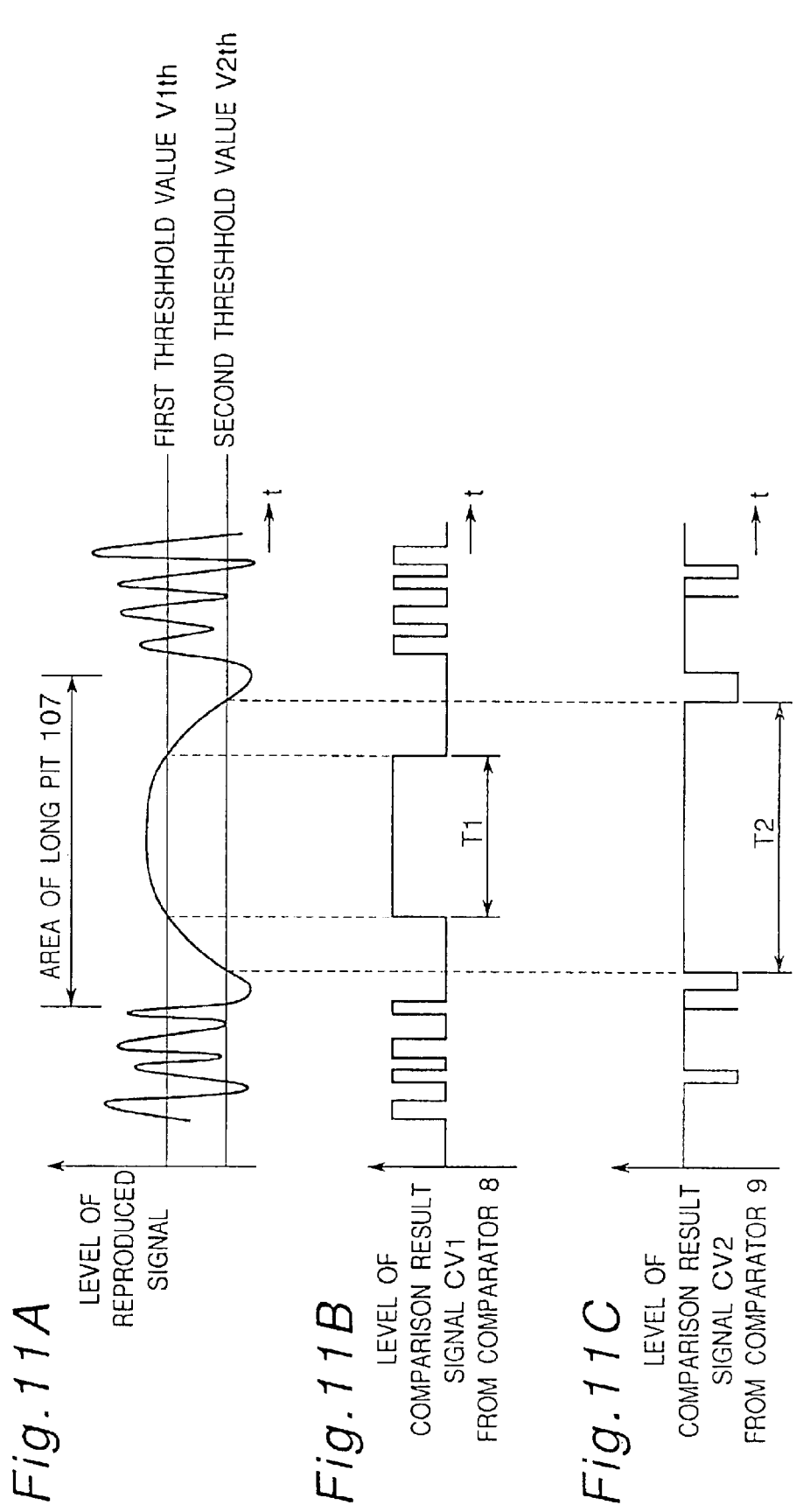

SECOND PREFERRED EMBODIMENT

Fig. 14 FIRST AREA DETECTING CIRCUIT 23

THIRD PREFERRED EMBODIMENT

OPTICAL DISK, AND METHOD AND APPARATUS FOR REPRODUCING INFORMATION RECORDED IN OPTICAL DISK

This application is a divisional application of Ser. No. 09/677,595, filed Oct. 3, 2000, now U.S. Pat. No. 6,661,768.

BACKGROUND OF THE INVENTION

1. Field of the Invention

The present invention relates to an optical disk for recording copyrighted content information, and a method and an apparatus for reproducing copyrighted content information recorded in an optical disk.

2. Description of the Related Art

In recent multimedia societies, optical disks such as a CD-ROM and a DVD have become remarkably widespread. With the widespread use of the optical disks, so-called pirated ROM disks have appeared and allow a pirate to benefit from the disk without compensating a copyright owner by fraud by illegally making a pirated copy of the optical disk. The percentage of pirated copies of disks is rapidly increasing. Illegal copying of the optical disk can take place in the following manner. Generally speaking, a pirate purchases an authorized optical disk, makes a master tape by reproducing information recorded on the optical disk by means of a disk drive, and mass-produces the pirated copies from the master tape by the same method as a general disk manufacturing method.

In order to protect against the above-mentioned unauthorized copying, some optical disks are devised so that they can be reproduced by only a player designed specifically for them. As this type of optical disk, for example, there is disclosed in the Japanese Patent Laid-Open Publication No 7-85574 a method including the steps of recording main information on an optical recording medium using a predetermined coding means, storing key information indicating decoding means for decoding the main information in a form of a barcode symbol in a mirror surface area or the like, reading our the key information by a reproducing apparatus, decoding and reproducing the main information utilizing a coding method indicated by the key information.

The above-mentioned method of protecting against unauthorized copying has such a very excellent advantage that a general optical disk player cannot reproduce the optical disk. However, the method is helpless against and cannot protect against copying means for performing copying involving no reproducing operation, i.e., for physically copying or transferring concavo-convex pits of data of a signal recorded on an optical disk surface as they are. This copying method requires no reproducing means, and can copy concavo-convex pit information of the optical disk as it is even though original data of signal to be recorded on the optical disk is made sophisticated and complicated. Therefore, the above mentioned method of protecting against unauthorized copying is useless.

SUMMARY OF THE INVENTION

An essential object of the present invention is, therefore, to provide an optical capable of protecting against copying means for physically copying concavo-convex pits of data of a signal recorded on an optical disk surface as they are.

Another object of the present invention is to further provide a method and apparatus for reproducing information recorded on the optical disk capable of protecting against copying means for physically copying concavo-convex pits of data of a signal recorded on an optical disk surface as they are.

In order to achieve the aforementioned objective, according to one aspect of the present invention, there is provided an optical disk for recording data of a signal modulated according to a predetermined modulation method in a form of concavo-convex pits, the optical disk comprising:

a first area having a reflecting film partly removed; and a second area for recording pits which are different from pits satisfying requirements of the predetermined modulation method.

According to another aspect of the present invention, there is provided an optical disk for recording data of a signal modulated according to a predetermined modulation method in a form of concavo-convex pits, the optical disk comprising:

a first area having a reflecting film partly removed;

a second area for recording pits which are different from pits satisfying requirements of the predetermined modulation method;

a first area location information recording area for recording location information of the first area on the disk; and a second area location information recording area for recording location information of the second area on the disk.

In the above-mentioned optical disk, the first area having the reflecting film partly removed is preferably included in a user data recording area for recording user data therein.

In the above-mentioned optical disk, the first area having the reflecting film partly removed preferably includes a portion, which is formed by removing the reflecting film, and which has a length longer than a maximum pit length determined by the requirements of the modulation method, in a circumferential direction of the optical disk.

In the above-mentioned optical disk, each of the pits recorded in the second area is preferably longer than a maximum pit length determined by the modulation method.

In the above-mentioned optical disk, each of the pits recorded in the second area is preferably longer than a maximum pit length determined by the modulation method, and wherein edges in the center of each of the pits recorded in the second area are inclined more gradually than edges in an end portion of each of the pits.

In the above-mentioned optical disk, the first area location information recording area and the second area location information recording area are preferably recorded in an area except for a user data recording area for recording user data therein.

According to a further aspect of the present invention, there is provided a method for reproducing information recorded on an optical disk which is provided for recording data of a signal modulated according to a predetermined modulation method in a form of concavo-convex pits, the optical disk comprising a first area having a reflecting film partly removed, and a second area for recording pits which are different from pits satisfying requirements of the predetermined modulation method, the method including the steps of:

detecting an area having the reflecting film partly removed, in accordance with a reproduced signal of the first area;

detecting a pit which is different from the pit satisfying the requirements of the predetermined modulation method, in accordance with a reproduced signal of the second area; and judging whether or not the information recorded on the optical disk should be reproduced, in accordance with results detected by the two steps of detecting.

According to a still further aspect of the present invention, there is provided a method for reproducing information recorded on an optical disk which is provided for recording data of a signal modulated according to a predetermined modulation method in a form of concavo-convex pits, the optical disk comprising a first area having a reflecting film partly removed, a second area for recording pits which are different from pits satisfying requirements of the predetermined modulation method, a first area location information recording area for recording location information of the first area on the disk, and a second area location information recording area for recording location information of the second area on the disk, the method including the steps of:

reproducing information recorded in the first area in accordance with the location information of the first area on the disk recorded in the first area location information recording area, and outputting a reproduced signal of the first area;

reproducing information recorded in the second area in accordance with the location information of the second area on the disk recorded in the second area location information recording area, and outputting a reproduced signal of the second area;

detecting an area having the reflecting film partly removed, in accordance with the reproduced signal of the first area;

detecting a pit which is different from the pit satisfying the requirements of the predetermined modulation method, in accordance with the reproduced signal of the second area; and judging whether or not the information recorded on the optical disk should be reproduced, in accordance with results detected by the two steps of detecting.

In the above-mentioned method, the step of reproducing information recorded in the first area preferably includes the step of reproducing information recorded in the first area in a defocus state.

In the above-mentioned method, the step of reproducing information recorded in the first area preferably includes the step of reproducing the information recorded in the first area by performing tracking an area located between two adjacent tracks.

In the above-mentioned method, the step of detecting the area having the reflecting film partly removed preferably includes the step of detecting whether or not the reflecting film is removed on the two adjacent tracks.

According to a still further aspect of the present invention, there is provided an apparatus for reproducing information recorded on an optical disk which is provided for recording data of a signal modulated according to a predetermined modulation method in a form of concavo-convex pits, the optical disk comprising a first area having a reflecting film partly removed, and a second area for recording pits which are different from pits satisfying requirements of the predetermined modulation method, the apparatus comprising:

a first area detecting circuit for detecting the first area in accordance with a reproduced signal from the optical disk upon reproducing information recorded in the first area, and outputting a first detecting signal;

a second area detecting circuit for detecting the second area in accordance with a reproduced signal from the optical disk upon reproducing information recorded in the second area, and outputting a second detecting signal; and judging means for judging whether or not the information recorded on the optical disk should be reproduced, in accordance with the first and second detecting signals.

According to a still further aspect of the present invention, there is provided an apparatus for reproducing information recorded on an optical disk which is provided for recording data of a signal modulated according to a predetermined modulation method in a form of concavo-convex pits, the optical disk comprising a first area having a reflecting film partly removed, a second area for recording pits which are different from pits satisfying requirements of the predetermined modulation method, a first area location information recording area for recording location information of the first area on the disk, and a second area location information recording area for recording location information of the second area on the disk, the apparatus comprising:

a first detecting window generating circuit for generating a first detecting window signal in accordance with the location information of the first area on the disk recorded in the first area location information recording area;

a second detecting window generating circuit for generating a second detecting window signal in accordance with the location information of the second area on the disk recorded in the second area location information recording area;

a first area detecting circuit for detecting the first area in accordance with a reproduced signal from the optical disk upon reproducing information recorded in the first area, and outputting a first detecting signal;

a second area detecting circuit for detecting the second area in accordance with a reproduced signal from the optical disk upon reproducing information recorded in the second area, and outputting a second detecting signal; and judging means for judging whether or not the information recorded on the optical disk should be reproduced, in accordance with the first detecting signal in a valid time interval of the first detecting window signal, and the second detecting signal in a valid time interval of the second detecting window signal.

In the above-mentioned apparatus, the first area detecting circuit preferably comprises a first comparator for comparing the reproduced signal from the optical disk upon reproducing information recorded in the first area, with a predetermined first threshold value, and outputting a first comparison result signal.

In the above-mentioned apparatus, the second area detecting circuit preferably comprises:

a second comparator for comparing the reproduced signal from the optical disk upon reproducing information recorded in the second area, with a predetermined second threshold value, and outputting a second comparison result signal;

a third comparator for comparing the reproduced signal from the optical disk upon reproducing information recorded in the second area, with a predetermined third threshold value, and outputting a third comparison result signal; and an arithmetic logic circuit for performing a logic operation between the second comparison result signal and the third comparison result signal, and outputting a logic operation result signal.

In the above-mentioned apparatus, the first area detecting circuit preferably detects the first area in accordance with a reproduced signal from the optical disk upon reproducing information recorded on a track including the first area, and a reproduced signal from the optical disk upon reproducing information recorded on a further track including the first area and adjacent to the track, and outputs the first detecting signal.

According to a further aspect of the present invention, there is provided a method for reproducing information recorded on an optical disk which is provided for recording data of a signal modulated according to a predetermined modulation method in a form of concavo-convex pits, the optical disk comprising a first area having a reflecting film partly removed, the method including the steps of:

detecting the first area in accordance with a reproduced signal from the optical disk upon reproducing information recorded in the first area, and outputting a first detecting signal; and judging whether or not the information recorded on the optical disk should be reproduced, in accordance with the first detecting signal.

In the above-mentioned method, the step of detecting the first area and outputting the first detecting signal preferably includes the step of:

detecting the first area in accordance with a reproduced signal from the optical disk upon reproducing information recorded on a track including the first area, and a reproduced signal from the optical disk upon reproducing information recorded on a further track including the first area and adjacent to the track, and outputting the first detecting signal.

In the above-mentioned method, the step of detecting the first area and outputting the first detecting signal preferably includes the step of:

judging whether or not the first area is detected in accordance with whether or not a first number of data from a predetermined sector address to the detected first area, which is counted based on the reproduced signal from the optical disk upon reproducing information recorded on the track including the first area, substantially coincides with a second number of data from the sector address to the detected first area, which is counted based on the reproduced signal from the optical disk upon reproducing information recorded on a further track including the first area and adjacent to the track.

According to a still further aspect of the present invention, there is provided an apparatus for reproducing information recorded on an optical disk which is provided for recording data of a signal modulated according to a predetermined modulation method in a form of concavo-convex pits, the optical disk comprising a first area having a reflecting film partly removed, the apparatus comprising:

detecting means for detecting the first area in accordance with a reproduced signal from the optical disk upon reproducing information recorded in the first area, and outputting a first detecting signal; and judging means for judging whether or not the information recorded on the optical disk should be reproduced, in accordance with the first detecting signal.

In the above-mentioned apparatus, the detecting means preferably detects the first area in accordance with a reproduced signal from the optical disk upon reproducing information recorded on a track including the first area, and a reproduced signal from the optical disk upon reproducing information recorded on a further track including the first area and adjacent to the track, and outputs the first detecting signal.

In the above-mentioned apparatus, the detecting means preferably judges whether or not the first area is detected in accordance with whether or not a first number of data from a predetermined sector address to the detected first area, which is counted based on the reproduced signal from the optical disk upon reproducing information recorded on the track including the first area, substantially coincides with a second number of data from the sector address and the detected first area, which is counted based on the reproduced signal from the optical disk upon reproducing information recorded on a further track including the first area and adjacent to the track.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 6A, 6B and 6C show signal waveforms of reproduced signals which are obtained during reproduction of information in an area of the non-reflecting portion 106 of the optical disk 1 shown in FIG. 1, in which the signal waveforms are proportional to the intensity of reflected light relative to a circumferential length, wherein FIG. 6A is a waveform chart of the signal waveform of the reproduced signal at a low degree of modulation, FIG. 6B is a waveform chart of the signal waveform of the reproduced signal at a high degree of modulation, and FIG. 6C is a waveform chart of the signal waveform of the reproduced signal at a high degree of modulation and in a defocus state;

FIG. 8 is a plan view showing a planar structure of the long pit 107 formed in the second area 3 of the optical disk 1 shown in FIG. 1;

FIGS. 9A and 9B show a sectional structure of the long pit 107 shown in FIG. 8, wherein FIG. 9A is a sectional view taken along the line A–A' of FIG. 8 located in the center of the long pit 107, and FIG. 9B is a sectional view taken along the line B–B' of FIG. 8 located in an end portion of the long pit 107;

FIG. 10 is a block diagram showing a configuration of a second area detecting circuit 24a for use in the first preferred embodiment of the invention;

FIGS. 11A, 11B and 11C show a method of detecting the second area by the second area detecting circuit 24a shown in FIG. 10, wherein FIG. 11A is a waveform chart of a signal waveform of a reproduced signal in an area including the area of the long pit 107, FIG. 11B is a waveform chart of a signal waveform of an output signal CV1 from a comparator 8 shown in FIG. 10, which uses a first threshold value voltage V1th, and FIG. 11C is a waveform chart of a signal waveform of an output signal CV2 from a comparator 9 shown in FIG. 10, which uses a second threshold value voltage V2th;

FIG. 12(a) shows waveform charts of the signal waveforms of the reproduced signals which are obtained during reproduction of information in the area of the non-reflecting portion 106 and the area of the long pit 107 on the authorized optical disk 1 according to the first preferred embodiment of the invention, FIG. 12(b) shows waveform charts of the signal waveforms of the reproduced signals which are obtained during reproduction of information in the area of the non-reflecting portion 106 and the area of the long pit 107 on a first pirated optical disk, and FIG. 12(c) shows waveform charts of the signal waveforms of the reproduced signals which are obtained during reproduction of information in the area of the non-reflecting portion 106 and the area of the long pit 107 on a second pirated optical disk;

DETAILED DESCRIPTION OF THE PREFERRED EMBODIMENTS

An optical disk, an optical disk reproducing method and an optical disk reproducing apparatus according to preferred embodiments of the invention will be described below with reference to the accompanying drawings. Herein, optical disks include an optical disk and a magneto-optical disk such as a CD, a video CD, a CD-ROM, a CD-R, a CD-RW, an MD, a DVD, a DVD-ROM, a DVD-RAM and a DVD-RW.

First Preferred Embodiment

Figure 1:
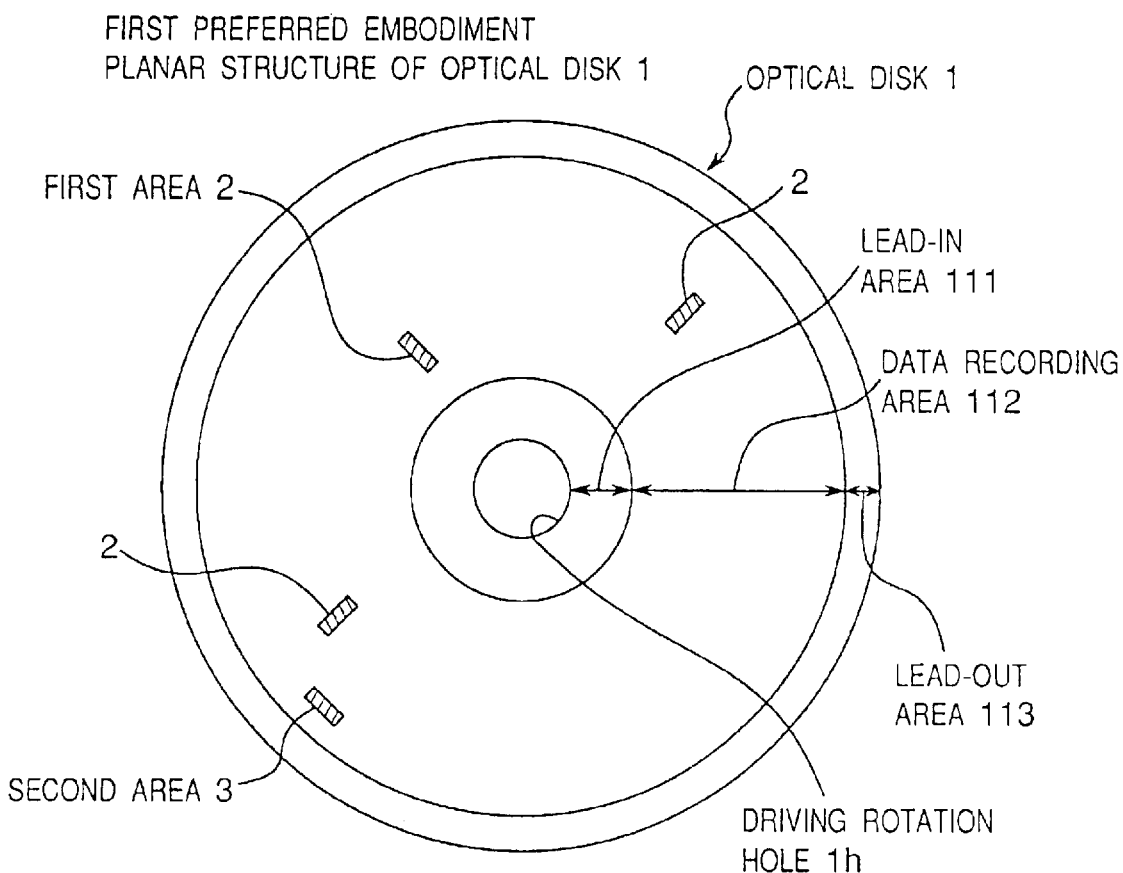
FIG. 1 is a plan view showing a planar structure of an optical disk 1 according to a first preferred embodiment of the invention.
Figure 2:
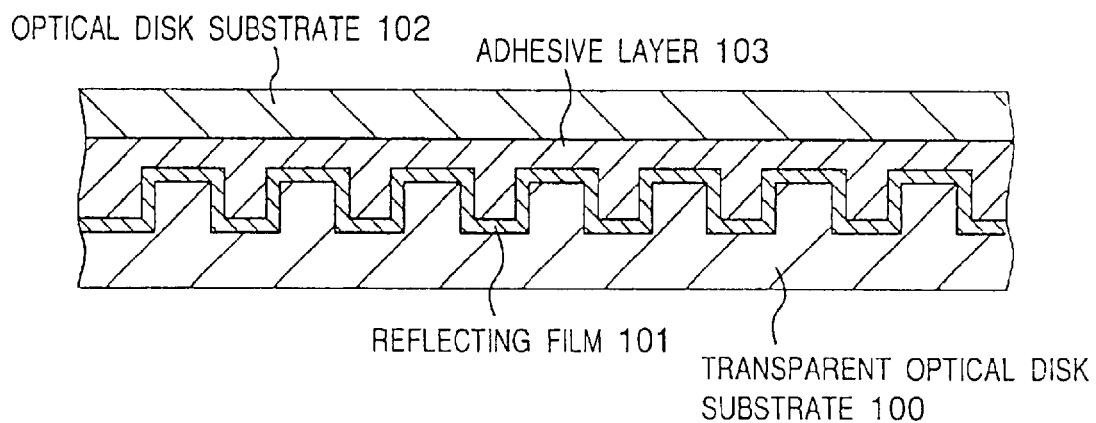
FIG. 2 is a sectional view showing a sectional structure of the optical disk 1 shown in FIG. 1.
Figure 3:
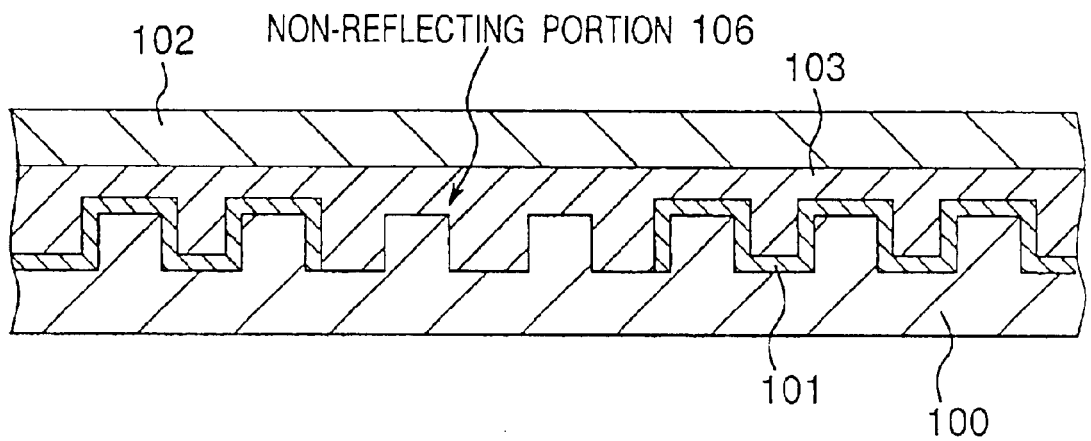
FIG. 3 is a sectional view showing a sectional structure of a first area 2 of the optical disk 1 shown in FIG. 1.
Figure 4:
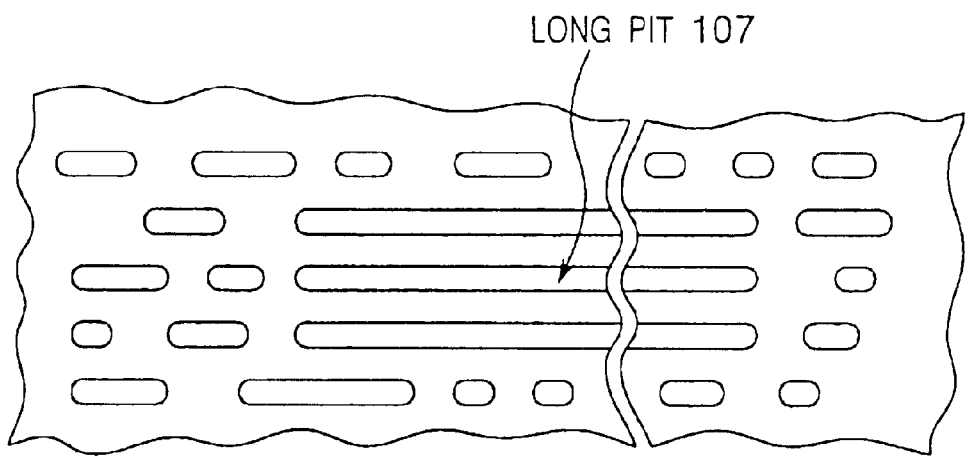
FIG. 4 is an enlarged view showing a second area 3 of the optical disk 1 shown in FIG. 1 and a plan view showing a planar structure of a long pit 107.

FIG. 1 is a plan view showing a planar structure of an optical disk 1 according to a first preferred embodiment of the invention, FIG. 2 is a sectional view showing a sectional structure of the optical disk 1 shown in FIG. 1, FIG. 3 is a sectional view showing a sectional structure of a first area 2 of the optical disk 1 shown in FIG. 1, and FIG. 4 is an enlarged view showing a second area 3 of the optical disk 1 shown in FIG. 1 and a plan view showing a planar structure of a long pit 107.

FIG. 1 shows a planar structure of an information recording area of the overall optical disk 1. The information recording area comprises a lead-in area 111 for recording control information, a data recording area 112 that is a user data recording area for recording content information composed of content control information and content data, and a lead-out area 113. The optical disk 1 has a rotation driving hole 1h in the center thereof. The lead-in area 111, the data recording area 112 and the lead-out area 113 are located in an order from the inside of the optical disk 1 toward the outside thereof. In the data recording area 112, the first area 2, which will be described later in detail, extends so as to have a longitudinal direction in a radial direction of the optical disk 1, while the second area 3, which will be described later in detail, extends so as to have a longitudinal direction in a circumferential direction of the optical disk 1.

As shown in FIG. 2, the optical disk 1 is formed of a bonded structure of a transparent optical disk substrate 100 and an optical disk substrate 102. A reflecting film 101 of a material such as aluminum or gold is formed, by using the sputtering method which has been already known to those skilled in the art, on one surface of the transparent optical disk substrate 100 which is formed so that concavo-convex pits are formed thereon based on a replica. Then, one surface of the optical disk substrate 102 made through another step is bonded onto the surface of the transparent optical disk substrate 100 on which the reflecting film 101 is formed, using an adhesive layer 103 made of an ultraviolet-curing resin which is located between the two optical disk substrates 100 and 102. After that, the bonded optical disk substrates 100 and 102 are irradiated with ultraviolet rays, and this leads to the adhesive layer 103 being allowed to cure and thus the two optical disk substrates 100 and 102 are firmly bonded to each other. As a result, the optical disk 1 is made.

Figure 5:
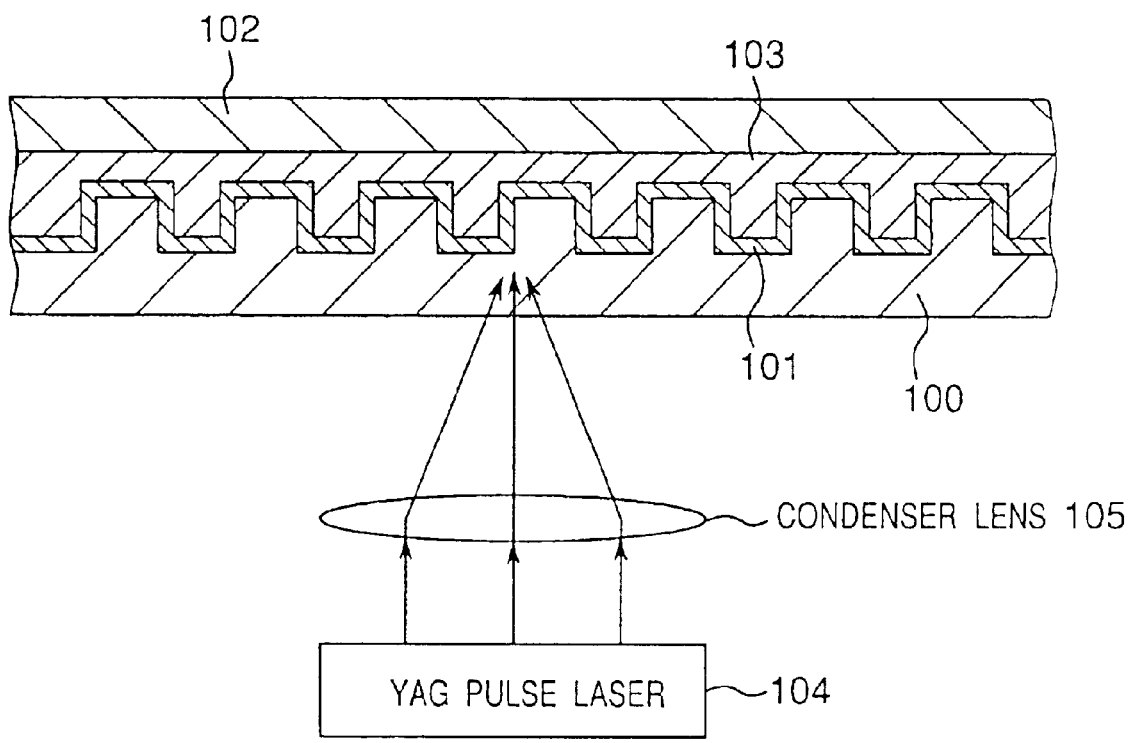
FIG. 5 is a sectional view and a block diagram showing a method of forming a non-reflecting portion 106 of the optical disk 1 shown in FIG. 1.

FIG. 3 shows a sectional structure of the first area 2 having a non-reflecting portion 106 formed by partly removing the reflecting film 101 in the optical disk 1 shown in FIG. 1. A method of making the non-reflecting portion 106 is disclosed in International Publication No. WO96/16401. With reference to the publication, the method of making the non-reflecting portion 106 will be briefly described with reference to FIG. 5. The optical disk 1 completed by the method described above with reference to FIG. 2 is irradiated on the side of the transparent optical disk substrate 100 with pulse laser light emitted from a YAG pulse laser 104 so that the pulse laser light is focused on the reflecting film 101 by a condenser lens 105. Thus, the reflecting film 101 is partly removed. As a consequence, the non-reflecting portion 106 is formed in the first area 2.

FIGS. 6A to 6C show signal waveforms of reproduced signals which are obtained during reproduction of information in an area of the non-reflecting portion 106 of the optical disk 1 shown in FIG. 1. In this case, the signal waveforms are proportional to the intensity of reflected light relative to a circumferential length. FIG. 6A is a waveform chart of the signal waveform of the reproduced signal at a low degree of modulation, FIG. 6B is a waveform chart of the signal waveform of the reproduced signal at a high degree of modulation, and FIG. 6C is a waveform chart of the signal waveform of the reproduced signal at a high degree of modulation and in a defocus state.

When information recorded in the first area 2 of the optical disk 1 configured as described above with reference to FIG. 5 is reproduced by using the optical disk reproducing apparatus, there are obtained the signal waveforms of the reproduced signals including RF signals changing periodically as shown in FIGS. 6A to 6C. At a low degree of modulation, a dark level of the periodic RF signal does not drop sufficiently. In this case, the dark level refers to the darkest level of an envelope of the RF signal, and is called an envelope bottom level. Therefore, as shown in FIG. 6A, the level of the reproduced signal in the area of the non-reflecting portion 106 is compared with a threshold value, namely, a first slice level that is lower than the envelope bottom level of the RF signal by a predetermined amount of level shift, and then, the presence of the non-reflecting portion 106 can be detected.

At a high degree of modulation, as shown in FIG. 6B, the envelope bottom level of the RF signal drops sufficiently. Thus, little or no difference is made between the envelope bottom level of the RF signal and an output level of the non-reflecting portion 106. Therefore, it is not easy to detect the non-reflecting portion 106. However, in this case, an optical head, i.e., an optical pickup of the optical disk reproducing apparatus is controlled so that a spot of the Laser light to be applied to the optical disk 1 becomes in a defocus state. Thus, the envelope bottom level of the reproduced RF signal rises, and therefore, a significant difference is made between the envelope bottom level of the RF signal and the level of the reproduced signal in the area of the non-reflecting portion 106. Consequently, the area of the non-reflecting portion 106 can be easily detected. In actuality, when an attempt is made to make the spot of the laser light on the optical disk 1 be in a defocus state and to reproduce information recorded on the optical disk 1, a reproduced clock signal, which is to be generated from the reproduced signal by a PLL circuit in an analog processor, cannot be, in some cases, generated. Therefore, in some cases, the PLL circuit is held immediately before the spot of the laser light is made in a defocus state, and the analog processor is controlled so as to hold and reproduce the reproduced clock signal in a state immediately before the defocus state.

Furthermore, it may be a possible method to reproduce information recorded in the first area 2 by performing tracking of an area located between two adjacent tracks on the optical disk 1. In this case, in a manner similar to above, the envelope bottom level, i.e., the dark level of the RE signal rises in any area other than the non-reflecting portion 106, however, the reproduced clock signal cannot be generated due to cross-talk between the RE signals. Thus, a reproduced clock immediately before tracking between the tracks is held and reproduced in a state immediately before tracking.

Figure 7:
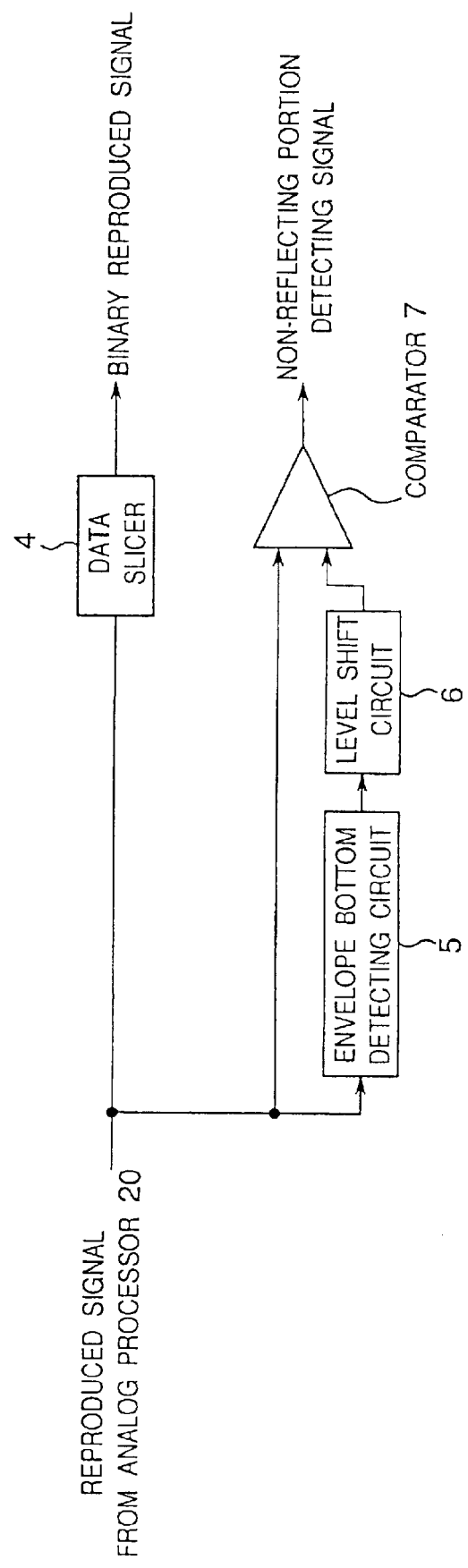
FIG. 7 is a block diagram showing a configuration of a first area detecting circuit 23a for use in the first preferred embodiment of the invention.

FIG. 7 is a block diagram showing a configuration of a first area detecting circuit 23a for use in the first preferred embodiment of the invention. The first area detecting circuit 23a comprises a data slicer 4, an envelope bottom detecting circuit 5, a level shift circuit 6, and a comparator 7.

Figure 16:
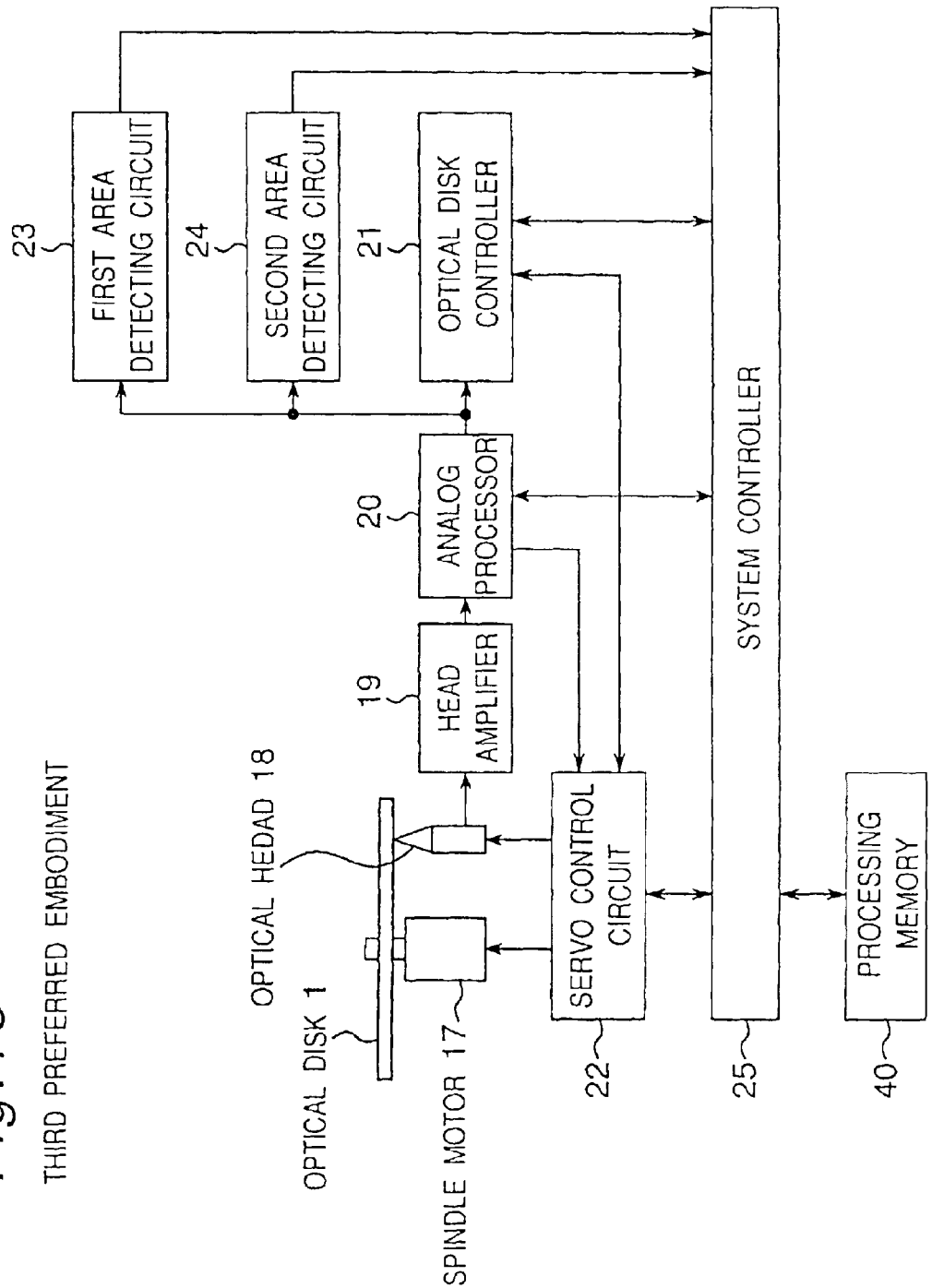
FIG. 16 is a block diagram showing a configuration of an optical disk reproducing apparatus for use in a third preferred embodiment of the invention.

Referring to FIG. 7, the reproduced signal outputted from an analog processor 20 of FIG. 16 for applying analog signal processing to the reproduced signal from the optical disk 1 is inputted to the data slicer 4, a first input terminal of the comparator 7 and the envelope bottom detecting circuit 5. The data slicer 4 binarizes the reproduced signal, which is inputted from the optical disk 1 through the analog processor 20, by using a predetermined threshold value. Thus, the data slicer 4 converts the reproduced signal into digital data, i.e., a binarized reproduced signal, and then, outputs the binarized reproduced signal. On the other hand, the envelope bottom detecting circuit 5 detects the envelope bottom level that is the lowest level of the envelope of the input reproduced signal, and then, outputs a low envelope signal having the detected envelope bottom level to the level shift circuit 6. Subsequently, the level shift circuit 6 shifts downward the envelope bottom level of the input low envelope signal by a predetermined amount of level shift (See FIGS. 6A and 6C), and then, outputs a threshold value signal having the above-mentioned level-shifted first slice level to a second input terminal of the comparator 7. Furthermore, the comparator 7 compares the reproduced signal inputted to the first input terminal with the threshold value signal having the first slice level inputted to the second input terminal. When the level of the reproduced signal is lower than the first slice level, i.e., in the area of the non-reflecting portion 106, the comparator 7 outputs a low-level signal as a non-reflecting portion detecting signal. In the above-mentioned manner, the area of the non-reflecting portion 106 in the first area 2 having the reflecting film partly removed can be easily detected.

Next, description will be made with regard to the second area 3 having a concavo-convex long pit 107 having a length longer than a maximum pit length determined by a predetermined modulation method, i.e., having a length which is different from concavo-convex pits satisfying the above-mentioned modulation method. As shown in the planar structures of FIGS. 4 and 8, the long pit 107 having a length equivalent to about 100T in the longitudinal direction parallel to the circumferential direction is formed in the second area 3, for example, provided that a pit length for generally recording user data in the data recording area 112 is 3T to 14T (where T denotes a length corresponding to one reproduced clock signal). FIGS. 9A and 9B show a sectional structure of the long pit 107 shown in FIG. 8. FIG. 9A is a sectional view taken along the line A–A' of FIG. 8 located in the center of the long pit 107. FIG. 9B is a sectional view taken along the line B–B' of FIG. 8 located in an end portion of the long pit 107.

As shown in FIGS. 9A and 9B, the long pit 107 has a sectional structure in which the curvature of each edge of a cross section of the long pit 107 is larger at the position closer to the circumferential, i.e., longitudinal center (referring to a portion located at the midpoint position between both end portions in the longitudinal direction). The cross section in the center of the long pit 107 has a sectional shape shown in FIG. 9A. The cross sections in both the end portions of the long pit 107 have a sectional shape shown in FIG. 9B. The long pit 107 having the above-mentioned sectional shape can be easily formed by appropriately setting conditions for forming the transparent optical disk substrate 100 of the optical disk 1, as well known.

FIG. 11A shows a signal waveform of a reproduced signal which is obtained when information recorded in the second area 3 is reproduced in the circumferential direction. The horizontal axis shown in FIGS. 11A, 11B and 11C represents the elapsed time corresponding to the circumferential length when information recorded in the second area 3 is reproduced in the circumferential direction by moving the spot of the laser light to be applied to the optical disk 1 at a constant speed.

As shown in FIG. 11A, as the spot of the laser light to be applied to the optical disk 1 is moved from one end of the long pit 107 to the longitudinal center of the long pit 107 in the circumferential direction, the level of the reproduced signal rises toward a bright level with a gradual gradient, and then, the level of the reproduced signal reaches the brightest level in the area of the long pit 107 in the longitudinal center of the long pit 107. Furthermore, as the spot of the laser light to be applied to the optical disk 1 is moved from the center of the long pit 107 to the other end of the long pit 107 in the circumferential direction, the level of the reproduced signal drops toward the dark level with a gradual gradient. The level of the reproduced signal changes in the area of the long pit 107 as mentioned above for the following reason. As shown in FIG. 9A, the curvature of the edge of the long pit 107 in which interference occurs is larger in the center of the long pit 107, thus a substantial pit depth D is not equal to a specified value, i.e., $\lambda/4$ (where $\lambda$ denotes an average wavelength of the laser light from an optical head 18), and, therefore, the level of the reproduced signal rises to the bright level.

Next, a method of identifying the second area 3 will be described with reference to FIGS. 10, 11A, 11B and 11C. FIG. 10 is a block diagram showing a configuration of a second area detecting circuit 24a for use in the first preferred embodiment of the invention. FIGS. 11A to 11C show a method of detecting the second area by the second area detecting circuit 24a shown in FIG. 10. FIG. 11A is a waveform chart of a signal waveform of a reproduced signal in an area including the area of the long pit 107. FIG. 11B is a waveform chart of a signal waveform of an output signal CV1 from a comparator 8 shown in FIG. 10, which uses a first threshold value voltage V1th close to the bright level. FIG. 11C is a waveform chart of a signal waveform of an output signal CV2 from a comparator 9 shown in FIG. 10, which uses a second threshold value voltage V2th close to the dark level.

Referring to FIG. 10, the second area detecting circuit 24a comprises the data slicer 4, the two comparators 8 and 9, two threshold value voltage generators 8a and 9a, two counters 10 and 11, and a normal length pit discriminating circuit 12. In FIG. 10, the same components as the components shown in FIG. 7 are indicated by the same reference numerals.

Referring again to FIG. 10, the reproduced signal outputted from the analog processor 20 of FIG. 16 for applying analog signal processing to the reproduced signal from the optical disk 1 is inputted to the data slicer 4 and the respective first input terminals of the two comparators 8 and 9. The data slicer 4 binarizes the reproduced signal, which is inputted from the optical disk 1 through the analog processor 20, by using a predetermined threshold value. Thus, the data slicer 4 converts the reproduced signal into digital data, i.e., a binarized reproduced signal, and then, outputs the binarized reproduced signal. On the other hand, the first threshold value voltage V1th from the threshold value voltage generator 8a is inputted to a second input terminal of the comparator 8. The comparator 8 compares the reproduced signal inputted to the first input terminal to the first threshold value voltage V1th close to the bright level, and then, outputs a comparison result signal to the counter 10. When the level of the reproduced signal is equal to or higher than the first threshold value voltage V1th, the comparator 8 outputs a high-level comparison result signal. In the other cases, the comparator 8 outputs a low-level comparison result signal. Moreover, the second threshold value voltage V2th from the threshold value voltage generator 9a is inputted to a second input terminal of the comparator 9. The comparator 9 compares the reproduced signal inputted to the first input terminal with the second threshold value voltage V2th close to the dark level, and then, outputs a comparison result signal to the counter 11. When the level of the reproduced signal is equal to or higher than the second threshold value voltage V2th, the comparator 9 outputs a high-level comparison result signal. In the other cases, the comparator 9 outputs a low-level comparison result signal.

Each of the counters 10 and 11 counts channel bit clock signals pck which are reproduced from the reproduced signals by the analog processor 20, during a valid time interval during which the input comparison result signal is at high level. Then, each of the counters 10 and 11 outputs time data of a count result (corresponding to the time interval T1 shown in FIG. 11B and the time interval T2 shown in FIG. 11C during which the comparison result signal is at high level) to the normal length pit discriminating circuit 12. Subsequently, when the time interval T2 shown in FIG. 11C is equal to or longer than a predetermined first threshold time and the time interval between the start of the time interval T2 (the leading edge of a pulse of the high-level comparison result signal in the time interval T2 in the area of the long pit 107) and the start of the time interval T1 (the leading edge of a pulse of the high-level comparison result signal in the time interval T1 in the area of the long pit 107) is equal to or longer than a predetermined second threshold time, the normal length pit discriminating circuit 12 judges that the presence of the long pit 107, i.e., the presence of the second area 3 is detected, and then, the circuit 12 outputs a long pit detecting signal.

In the case of a typical normal pit, in a form of which data of a signal modulated according to using a predetermined modulation method is recorded on the optical disk 1, the reproduced level of the normal pit abruptly or suddenly changes from the dark level to the bright level, and the time interval for the change is substantially fixed. However, the reproduced level of the above-mentioned long pit 107 gradually changes from the dark level to the bright level with a more gradual gradient than the gradient of change in the typical normal pit. Therefore, the long pit 107 or the second area 3 can be easily detected by using the above-described method, i.e., by using the second area detecting circuit 24a shown in FIG. 10.

Description will be made with regard to the case in which a pirate makes a so-called RF copy of the optical disk 1 as configured as described above. "RF copying" described herein refers to making a copy of the optical disk is made by using a stamper made by the use of an RF signal that is a reproduced signal from the optical disk 1.

Figure 12:
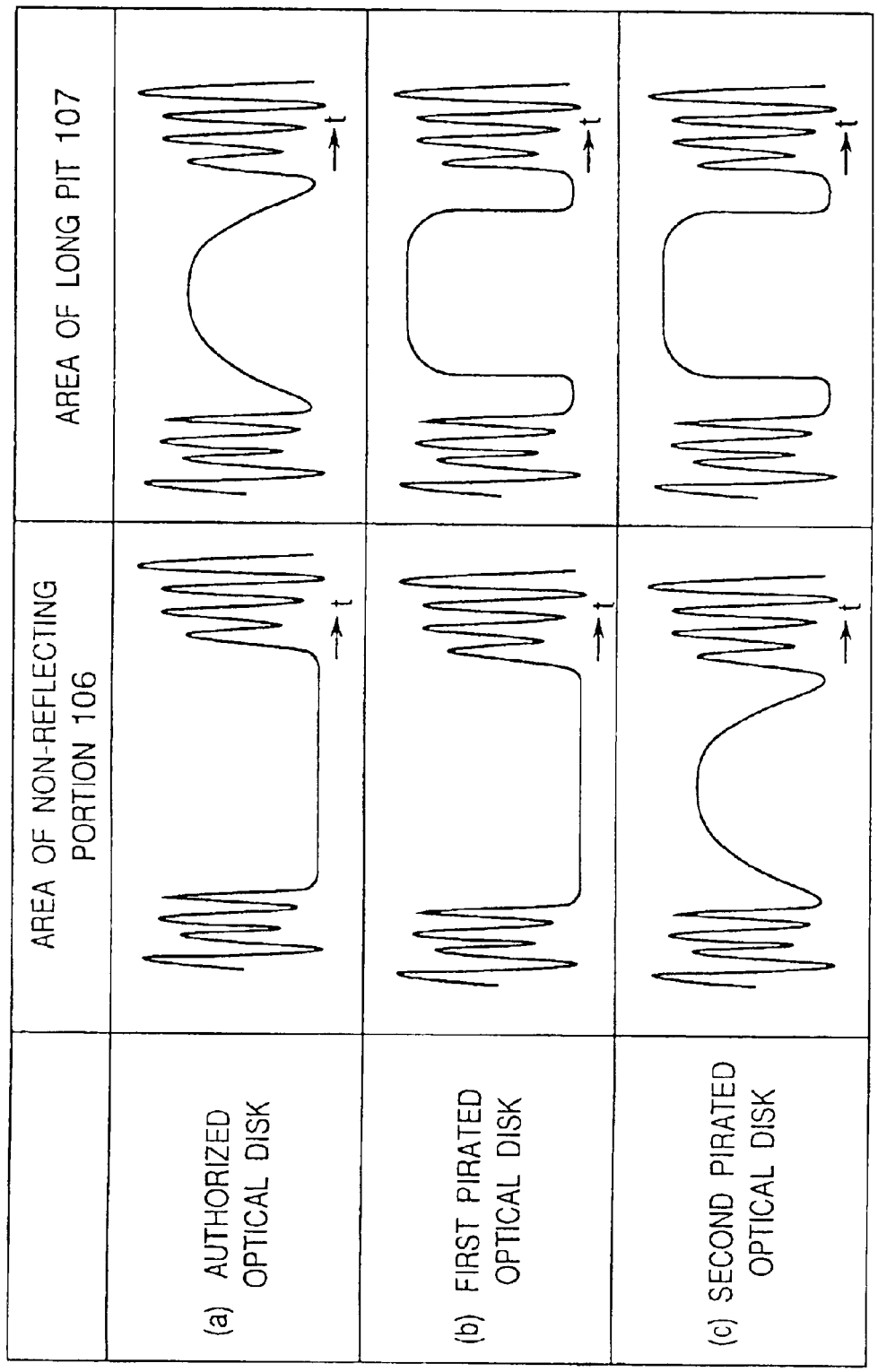
FIG. 12 shows a table of waveform charts of signal waveforms of reproduced signals which are obtained during reproduction of information in the area of the non-reflecting portion 106 and the area of the long pit 107 on each optical disk, where

Description will be made with reference to FIG. 12 with regard to the case in which the optical disk 1 is made as mentioned above. FIG. 12 shows a table of waveform charts of signal waveforms of reproduced signals which are obtained during reproduction of information in the area of the non-reflecting portion 106 and the area of the long pit 107 on each optical disk. FIG. 12(a) shows waveform charts of the signal waveforms of the reproduced signals which are obtained during reproduction of information in the area of the non-reflecting portion 106 and the area of the long pit 107 on the authorized optical disk 1 according to the first preferred embodiment of the invention. FIG. 12(b) shows waveform charts of the signal waveforms of the reproduced signals which are obtained during reproduction of information in the area of the non-reflecting portion 106 and the area of the long pit 107 on a first pirated optical disk made by RF copying. FIG. 12(c) shows waveform charts of the signal waveforms of the reproduced signals which are obtained during reproduction of information in the area of the non-reflecting portion 106 and the area of the long pit 107 on a second pirated optical disk made under changed conditions from forming the first pirated optical disk.

In general, the non-reflecting portion 106 of the pirated optical disk, which is made by making a RF copy of the reproduced signal of the non-reflecting portion 106 as it is, is recorded as the long pit. The long pit 107 of the authorized optical disk is judged as the presence or absence of the pit, and thus the long pit 107 of the pirated optical disk is recorded as if the length of the long pit 107 were reduced.

Therefore, as shown in FIG. 12, when information recorded on the pirated optical disk is reproduced, the RF signal contains a long-time dark level signal in an area corresponding to the first area 2 of the authorized optical disk, and thus, it seems as if the long pit 107 were formed in the above-mentioned area. However, the signal waveform of the reproduced signal that settles at the dark level and is continuous (See a column of the area of the non-reflecting portion 106 shown in FIG. 12(b)), or the signal waveform of the reproduced signal similar to the reproduced signal of the second area 3 of the authorized optical disk (See a column of the area of the non-reflecting portion 106 shown in FIG. 12(c)) is obtained in accordance with the forming conditions.

Information recorded in a portion corresponding to the second area 3 of the authorized optical disk is reproduced as a long bright level sandwiched between short dark levels. When a pirated, unauthorized optical disk is copied by using the stamper made by the use of the RF signal, a pit shorter than the normal long pit 107 is recorded. Moreover, the reproduced level of the shorter pit changes from the dark level to the bright level more abruptly or suddenly than the long pit 107 of the authorized optical disk (See a column of the area of the long pit 107 shown in FIG. 12(b) and FIG. 12(c)). As described above, it is judged whether or not the optical disk is the authorized optical disk 1 in accordance with a combination of the reproduced signal of the non-reflecting portion 106 and the reproduced signal of the long pit 107. Thus, it can be judged whether or not information recorded on the optical disk 1 is reproduced.

As described above, according to the preferred embodiment, the optical disk, which is used for recording data of a signal modulated according to a predetermined modulation method in a form of concavo-convex pits, comprises the first area 2 having the reflecting film partly removed, and the second area 3 for recording pits which are different from pits satisfying the requirements of the predetermined modulation method. Thus, the pirated optical disk is easily identified, and it can be judged whether or not information recorded on the optical disk is reproduced. Therefore, the optical disk 1 capable of protecting the right of a copyright owner can be provided.

Second Preferred Embodiment

Figure 13:
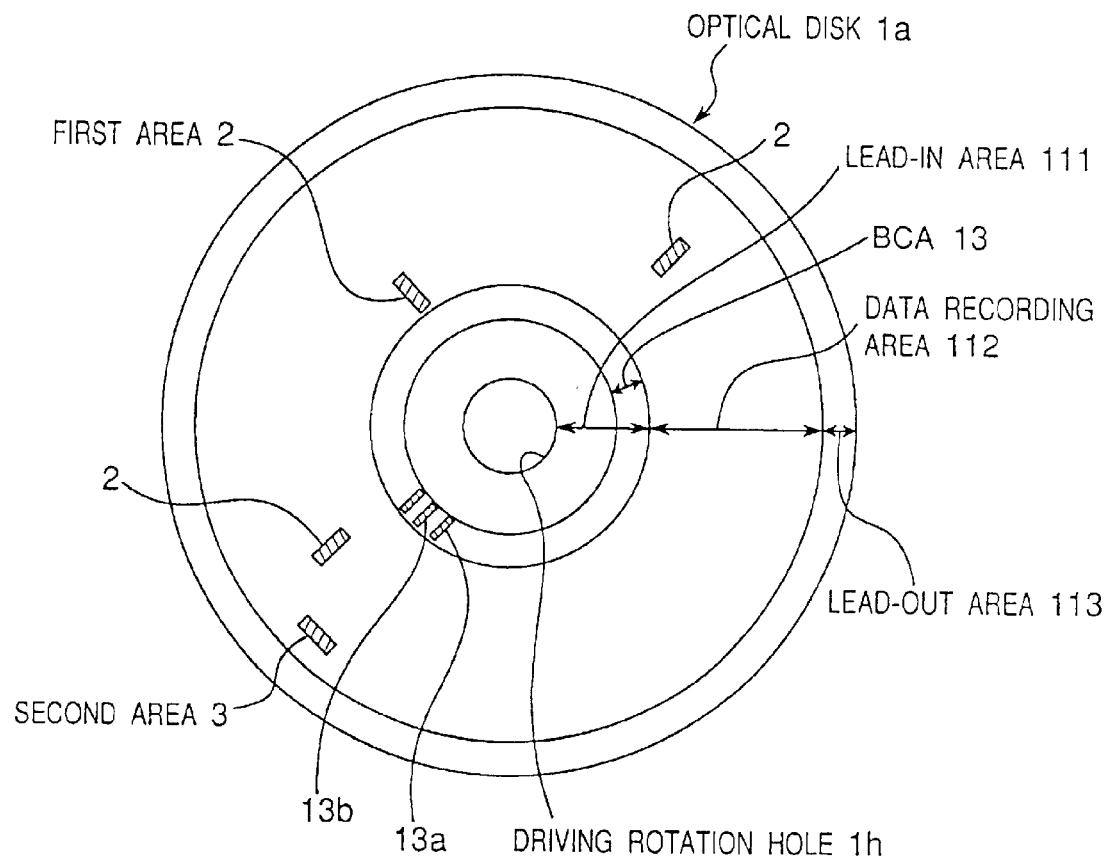
FIG. 13 is a plan view showing a planar structure of an optical disk 1a according to a second preferred embodiment of the invention.

FIG. 13 is a plan view showing a planar structure of an optical disk 1a according to a second preferred embodiment of the invention. The optical disk 1a according to the second preferred embodiment is characterized by that the optical disk 1 according to the first preferred embodiment has a recording area called a BCA (Burst Cutting Area) 13 in which location information of the first area is stored in a first area location information recording area 13a and location information of the second area is stored in a second area location information recording area 13b. The other structure of the optical disk 1a is the same as that of the optical disk 1 according to the first preferred embodiment. When information recorded on the optical disk 1a according to the second preferred embodiment is reproduced, whether or not the optical disk is the authorized optical disk 1a is more easily judged in accordance with the location information recorded in the first area location information recording area 13a and the second area location information recording area 13b in the BCA 13.

Figure 14:
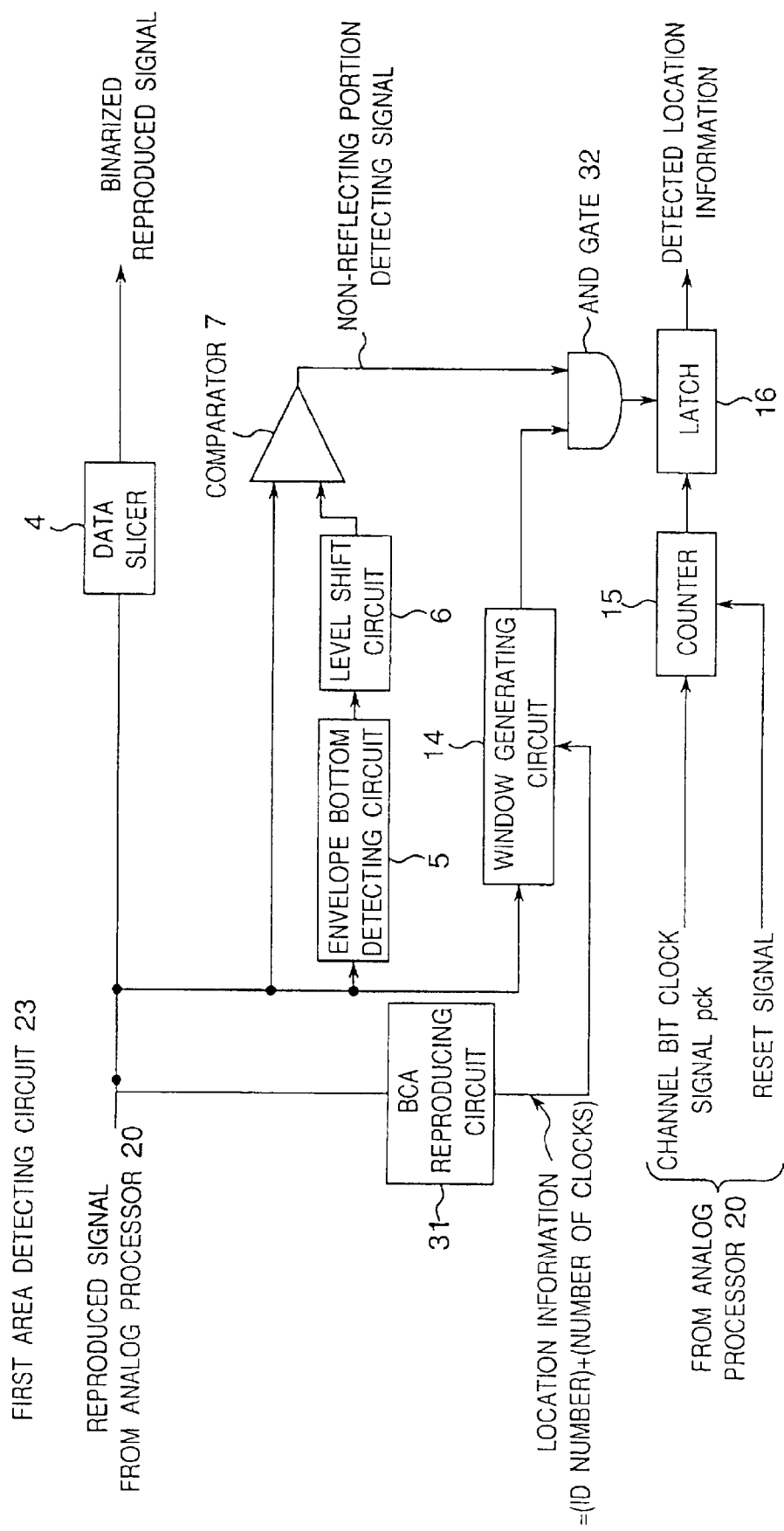
FIG. 14 is a block diagram showing a configuration of a first area detecting circuit 23 for use in the second preferred embodiment of the invention.

FIG. 14 is a block diagram showing a configuration of a first area detecting circuit 23 for use in the second preferred embodiment of the invention. In FIG. 14, the same components as the components of the first area detecting circuit 23a shown in FIG. 7 are indicated by the same reference numerals, and the detailed description thereof is omitted. In the present preferred embodiment, an address of the non-reflecting portion 106 and an address of the long pit 107 are written in the BCA 13, and each of the addresses contains location information composed of an ID number and the number of clocks.

Referring to FIG. 14, the first area detecting circuit 23 comprises a window generating circuit 14, a counter 15, a latch 16, a BCA reproducing circuit 31 and an AND gate 32, in addition to the data slicer 4, the envelope bottom detecting circuit 5, the level shift circuit 6 and the comparator 7.

The BCA reproducing circuit 31 reproduces information data recorded in the BCA 13 of the optical disk 1a, in particular, reproduces the address of the location information composed of the ID number and the number of clocks, and outputs the reproduced information data to the window generating circuit 14. Then, the window generating circuit 14 generates a window signal for detecting the non-reflecting portion 106 in accordance with the location information that is recorded in the BCA 13 and reproduced from the BCA 13 by the BCA reproducing circuit 31, and the circuit 14 outputs the window signal to a second input terminal of the AND gate 32. In other words, the window generating circuit 14 compares the address contained in the reproduced signal with the address of the location information in accordance with the reproduced signal outputted from the analog processor 20 and the location information from the BCA reproducing circuit 31. When these addresses coincide with each other, the window generating circuit 14 outputs a high-level window signal, and thus, enables a window. When these addresses does not coincide with each other, the window generating circuit 14 outputs a low-level window signal, and thus, disables the window. After the count of the counter 15 is reset to zero in accordance with a reset signal from the analog processor 20, the counter 15 counts the channel bit clock signals pck, i.e., the reproduced clocks that are generated from the reproduced signals by the analog processor 20, and the counter 15 outputs count data to the latch 16. The count data indicates circumferential location information since the instant when the count is reset in accordance with the reset signal.

The non-reflecting portion detecting signal from the comparator 7 is inputted to a first input terminal of the AND gate 32. The AND gate 32 outputs a high-level signal to the latch 16 only when both of two input signals are at high level. Therefore, the AND gate 32 outputs the high-level signal to the latch 16, when the non-reflecting portion 106 is detected by the comparator 7 and the location information from the BCA 13 coincides with the location information of the reproduced signal. In response to the high-level signal, the latch 16 latches the count data outputted from the counter 15 by the use of the non-reflecting portion detecting signal obtained during the valid time interval of the window generated by the window generating circuit 14, and then, the latch 16 outputs correct detected location information.

Figure 15:
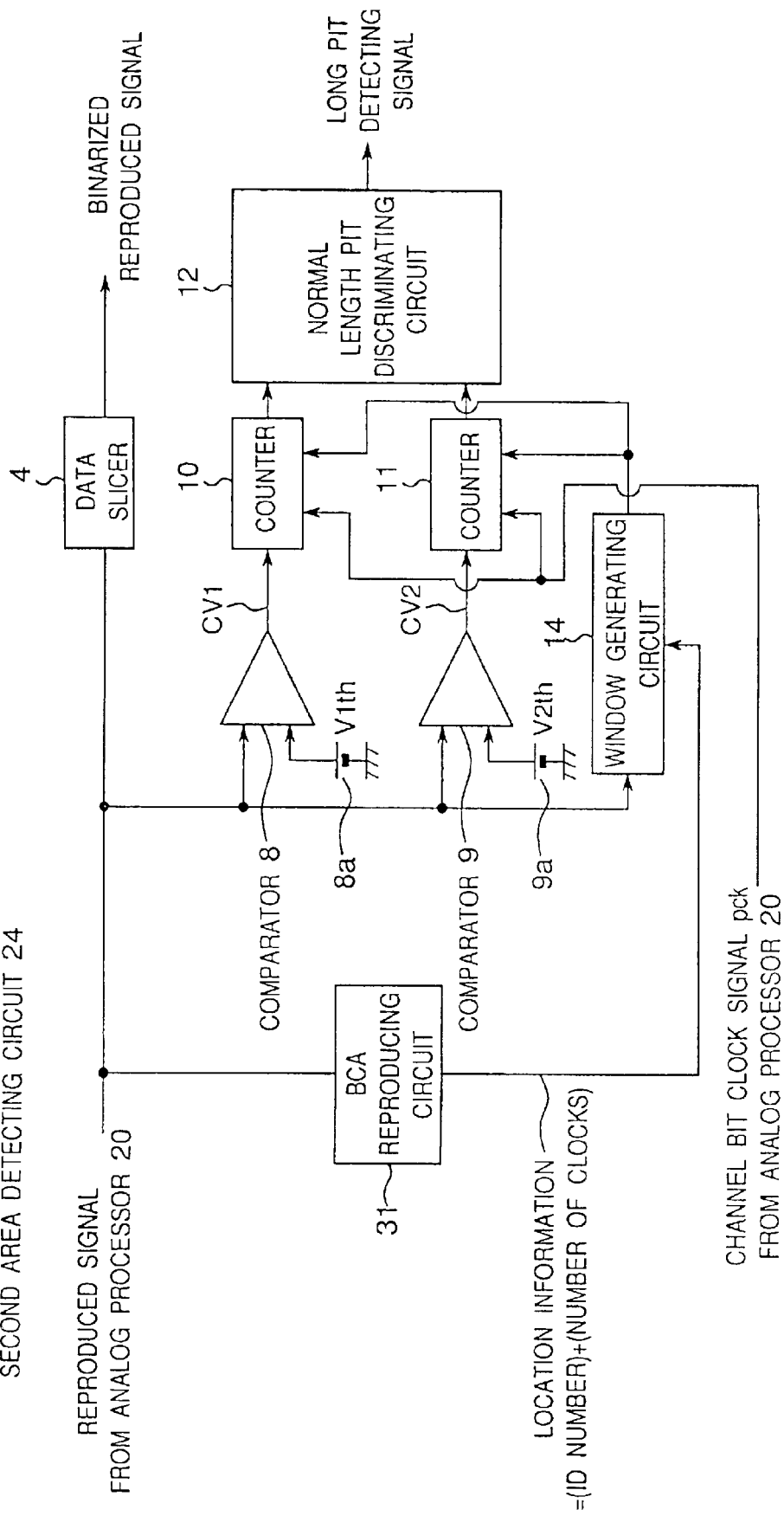
FIG. 15 is a block diagram showing a configuration of a second area detecting circuit 24 for use in the second preferred embodiment of the invention.

FIG. 15 is a block diagram showing a configuration of a second area detecting circuit 24 for use in the second preferred embodiment of the invention. In FIG. 15, the same components as the components of the second area detecting circuit 24a shown in FIGS. 14 and 10 are indicated by the same reference numerals.

The second area detecting circuit 24 according to the second preferred embodiment is characterized by the second area detecting circuit 24 further comprising the BCA reproducing circuit 31 and the window generating circuit 14, in addition to the data slicer 4, the two comparators 8 and 9, the two threshold value voltage generators 8a and 9a, the two counters 10 and 11, and the normal length pit discriminating circuit 12.

Referring to FIG. 15, in a manner similar to that of the BCA reproducing circuit 31 and the window generating circuit 14 shown in FIG. 14, the window generating circuit 14 generates a window signal for detecting the long pit 107 in accordance with the location information reproduced from the BCA 13 by the BCA reproducing circuit 31, and the circuit 14 outputs the window signal to each of the counters 10 and 11. Only when a high-level window signal is inputted to each of the counters 10 and 11, the window generating circuit 14 opens the window, and causes the counters 10 and 11 to operate only during the time interval of the window, and then, the normal length pit discriminating circuit 12 judges the presence or absence of the long pit 107.

Furthermore, a method of identifying the authorized optical disk 1a by using the first area detecting circuit 23 shown in FIG. 14, and the second area detecting circuit 24 shown in FIG. 15 will be described.

First of all, before reproducing the content information recorded on the optical disk 1a, the location information recorded in the BCA 13 is read out by using the BCA reproducing circuit 31. Then, the optical head 18 shown in FIG. 16 is allowed to perform a seek in accordance with the location information, thereby reproducing information recorded in the first area 2. A method of detecting the non-reflecting portion 106 from the reproduced signal is the same as the method of the first preferred embodiment, and thus, the description thereof is omitted. The intensity of copyright protection further improves because of the addition of judgment about the presence or absence of the long pit 107 in the location recorded in the location information. Furthermore, the location information recorded in the BCA 13 is read out by using the BCA reproducing circuit 31. Then, the optical head 18 shown in FIG. 16 is allowed to perform seeks in accordance with the location information, thereby reproducing information recorded in the second area 3. Then, the legality of the long pit 107 is judged in accordance with the reproduced signal. Whether or not the optical disk 1a is authorized is judged in accordance with detected signals from the reproduced signals of the first area 2 and the second area 3. Thus, there can be judged whether or not information recorded on the optical disk 1a is reproduced. Thus, the so-called RF copy can be prevented, and therefore, a copyright can be more solidly or certainly protected.

In the present preferred embodiment, the location information recorded in the area 13a for recording the location information of the first area 2 and the area 13b for recording the location information of the second area 3 contains the address, for example. Specifically, as shown in FIGS. 14 and 15, the location information can be specified by the address of the ID number or the like, and the number of clocks of the channel bit clock signals pck from a sector header to a detected sector. The location information recorded in the area 13a for recording the location information of the first area 2 and the area 13b for recording the location information of the second area 3 is not limited to this, and may be any other type of location information capable of specifying the respective locations of the non-reflecting portion 106 and the long pit 107.

As described above, according to the present preferred embodiment, the optical disk 1a, which is provided for recording data of a signal modulated according to a predetermined modulation method in a form of concavo-convex pits, comprises the first area 2 having the non-reflecting portion 106 formed by partly removing the reflecting film, and the second area 3 for recording the long pit 107 which is different from pits satisfying the requirements of the predetermined modulation method. Moreover, for example, the BCA 13 includes the first area location information recording area 13a for recording the location information of the first area 2 on the optical disk 1a, and the second area location information recording area 13b for recording the location information of the second area 3 on the optical disk 1a. The non-reflecting portion 106 formed in the first area 2 and the long pit 107 formed in the second area 3 are identified by specifying the respective positions of the areas 2 and 3 in accordance with the location information recorded in the first area location information recording area 13a and the second area location information recording area 13b. Thus, the authorized optical disk 1a is more easily identified at high speed. Therefore, there can be judged whether or not information recorded on the optical disk 1a is reproduced.

Third Preferred Embodiment

FIG. 16 is a block diagram showing a configuration of an optical disk reproducing apparatus for use in a third preferred embodiment of the invention. The optical disk reproducing apparatus according to the third preferred embodiment comprises the optical head 18, a head amplifier 19, the analog processor 20, an optical disk controller 21, a servo control circuit 22, the first area detecting circuit 23, the second area detecting circuit 24, a system controller 25, and a processing memory 40. In FIG. 16, the optical disk 1 may be replaced with the optical disk 1a according to the second preferred embodiment.

Referring to FIG. 16, a spindle motor 17 rotates the optical disk 1 at a predetermined number of revolutions. The optical head 18 includes a laser diode and a photo-detector, and comprises the so-called optical pickup. A signal reproduced by the optical head 18 is inputted to the analog processor 20 through the head amplifier 19 for amplifying the signal. The analog processor 20 has facilities for AGC, equalizing, data slice, PLL and so on. The analog processor 20 applies predetermined analog processing to the input analog reproduced signal, and outputs the processed analog signal to the optical disk controller 21, the first area detecting circuit 23 and the second area detecting circuit 24. Furthermore, the optical disk controller 21 demodulates the reproduced signal data, and applies error correction or the like to the data. Furthermore, the servo control circuit 22 controls the spindle motor 17 and the optical head 18, thereby servo-controlling focusing, tracking and the like.

The first area detecting circuit 23 comprises the circuit according to the second preferred embodiment shown in FIG. 14, for example. In accordance with the reproduced signal outputted from the analog processor 20, the first area detecting circuit 23 detects the first area 2 having the non-reflecting portion 106 formed by partly removing the reflecting film, and then, the circuit 23 outputs the detected location information. The first area detecting circuit 23 may be replaced with the first area detecting circuit 23a according to the first preferred embodiment shown in FIG. 7. The second area detecting circuit 24 comprises the circuit according to the second preferred embodiment shown in FIG. 15, for example. In accordance with the reproduced signal outputted from the analog processor 20, the second area detecting circuit 24 detects the second area 3 having the long pit 107 which is different from pits satisfying requirements of a predetermined modulation method, and has a length not satisfying any requirement of the above-mentioned modulation method. Then, the circuit 24 outputs the long pit detecting signal. The second area detecting circuit 24 may be replaced with the second area detecting circuit 24a according to the first preferred embodiment shown in FIG. 10. The system controller 25 is a controller for controlling operation of the whole optical disk reproducing apparatus shown in FIG. 16 by using the processing memory 40.

An operation of the optical disk reproducing apparatus configured as described above will be described with reference to FIG. 17.

Figure 17:
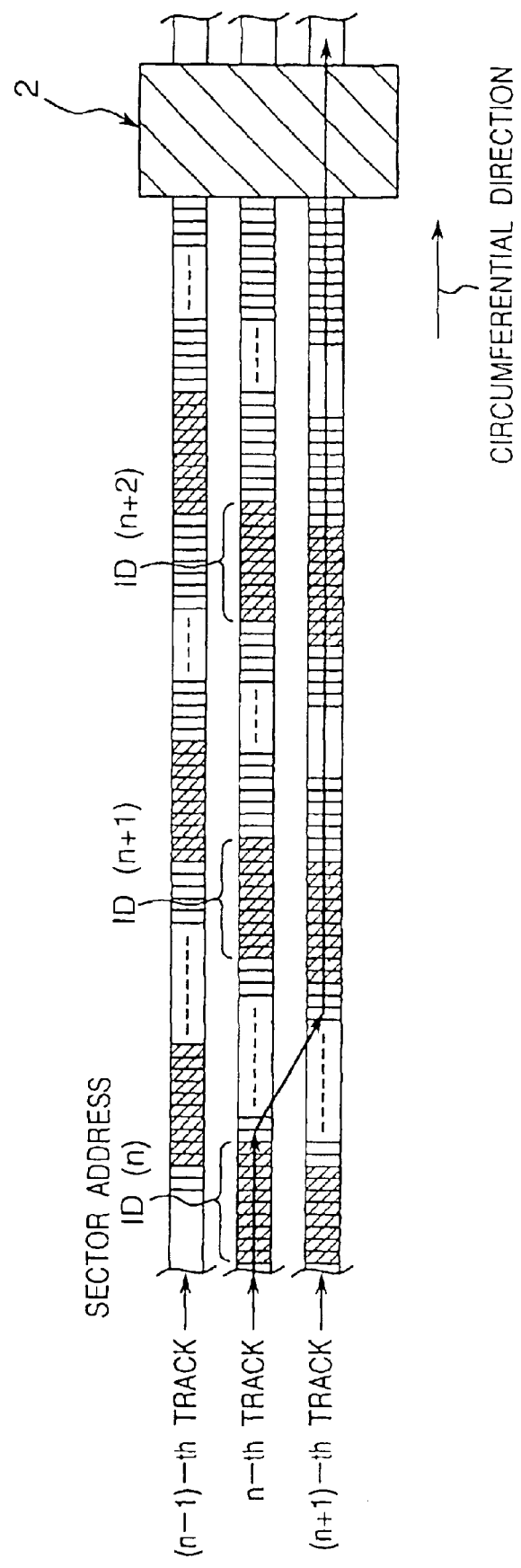
FIG. 17 shows a method of detecting the first area 2 for use in the optical disk reproducing apparatus shown in FIG. 16 and is an enlarged plan view showing the correlation from each track on the optical disk 1 in a circumferential direction to the first area 2.

FIG. 17 shows a method of detecting the first area 2 for use in the optical disk reproducing apparatus shown in FIG. 16, and is an enlarged plan view showing a correlation between each track on the optical disk 1 in the circumferential direction and the first area 2. In the present preferred embodiment, it is assumed that the location information of the first area 2 having the non-reflecting portion 106 is previously stored in the BCA 13, and that the contents of the location information are composed of a sector address of a sector containing the first area 2 and the number of data (or the number of clocks) from the sector header to the above-mentioned detected sector. A method of detecting the second area 3 having the long pit 107 is the same as the method of using the second area detecting circuit 24 according to the second preferred embodiment, and thus, the description thereof is omitted.

Figure 18:
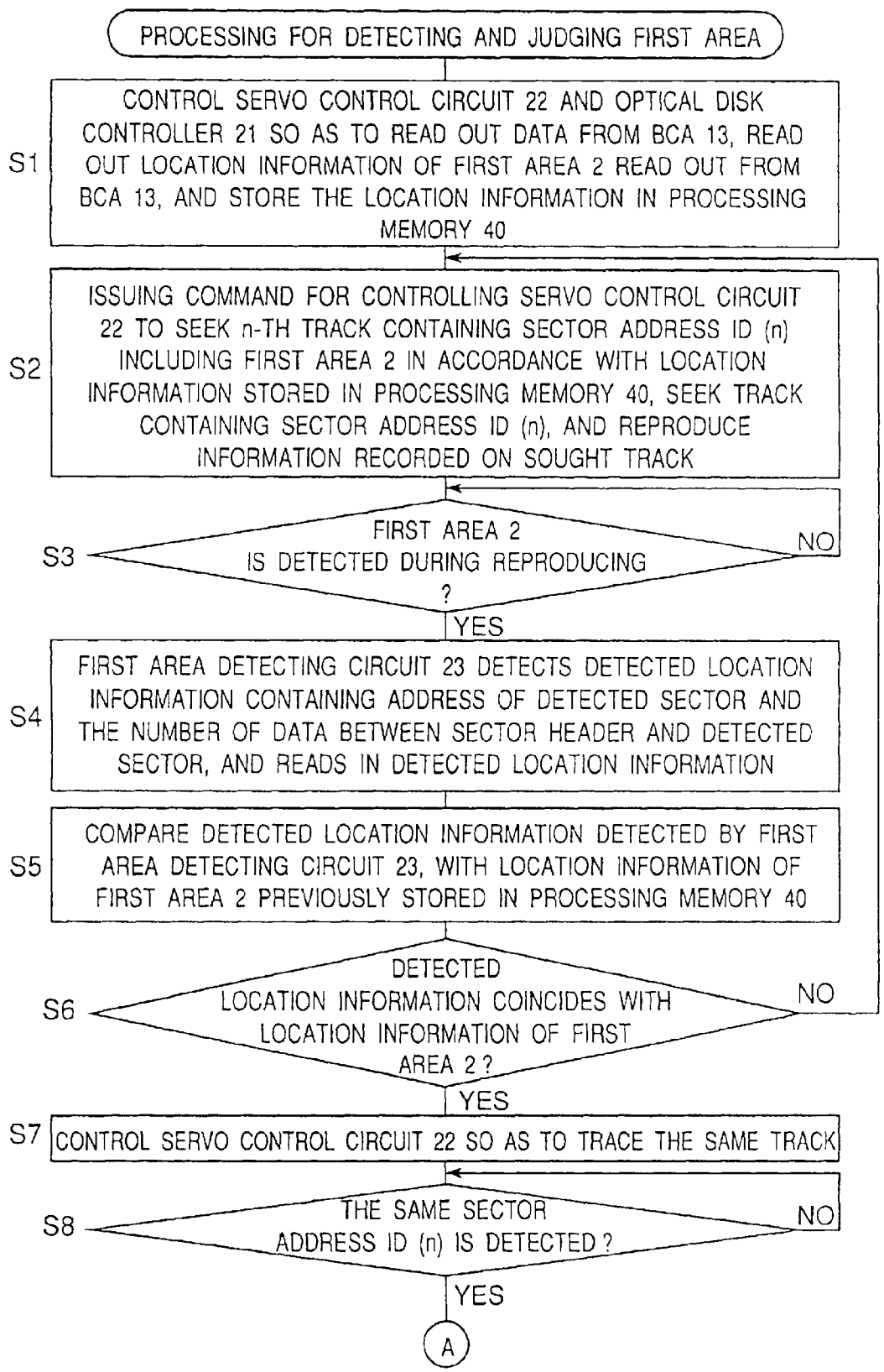
FIG. 18 is a flow chart of a first portion of processing for detecting and judging the first area to be executed by a system controller 25 shown in FIG. 16.
Figure 19:
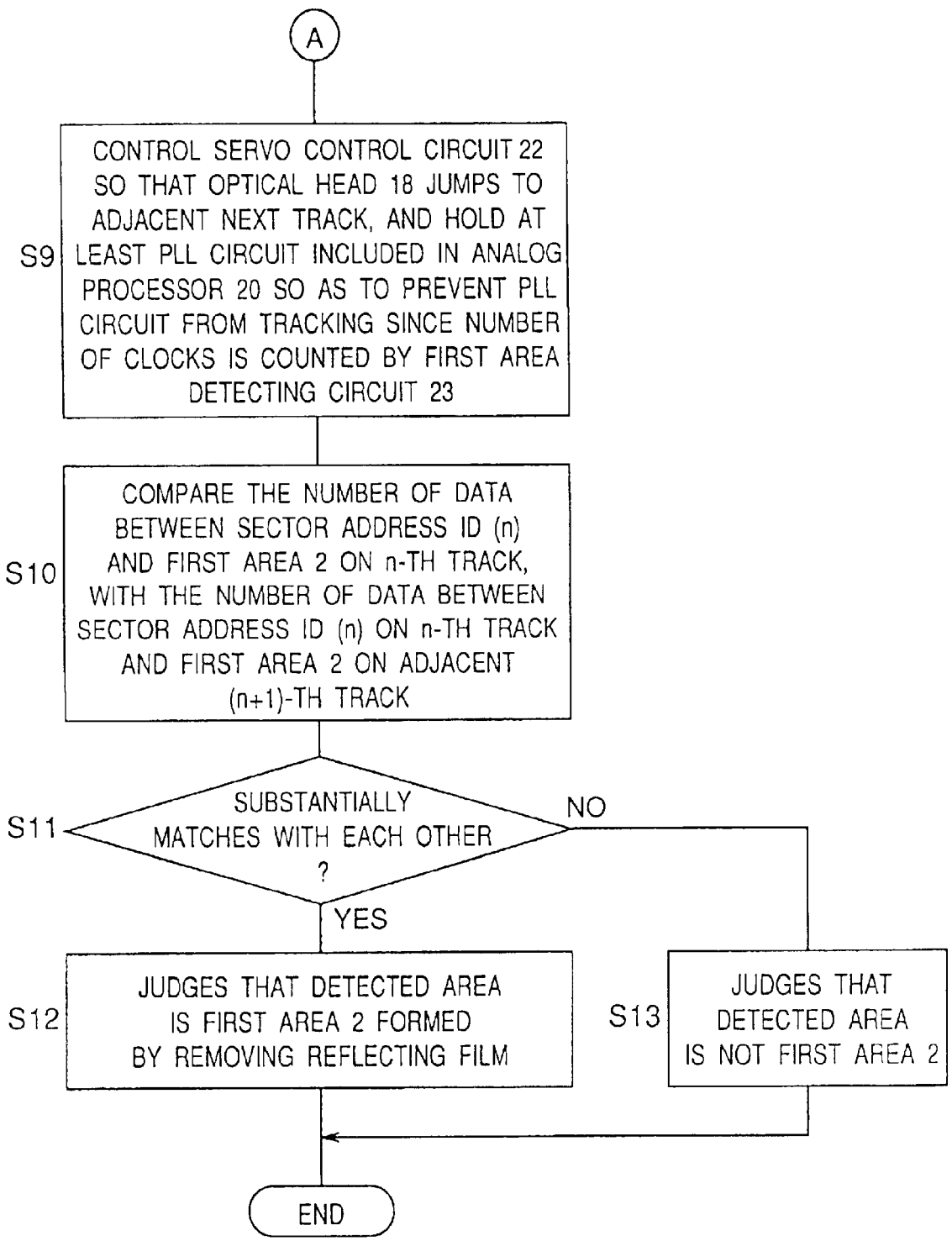
FIG. 19 is a flow chart of a second portion of the processing for detecting and judging the first area to be executed by the system controller 25 shown in FIG. 16.

FIGS. 18 and 19 are flow charts of processing for detecting and judging the first area to be executed by the system controller 25 shown in FIG. 16.

In step S1 of FIG. 18, first of all, the servo control circuit 22 and the optical disk controller 21 are controlled so as to read out data from the BCA 13, and the location information of the first area 2 read out from the BCA 13 is read out and stored in the processing memory 40. Subsequently, in step S2, as shown in FIG. 17, a command for controlling the servo control circuit 22 to seek the n-th track containing a sector address ID(n) including the first area 2 is issued in accordance with the location information stored in the processing memory 40, then the track containing the sector address ID(n) is sought, and information recorded on the sought track is reproduced. Furthermore, in step S3, it is judged whether or not the first area 2 is detected during reproducing. Until YES is given, the processing of step S3 is repeated. When YES is given, in step S4, the first area detecting circuit 23 detects detected location information containing the address of the detected sector and the number of data from the sector header to the detected sector, and reads in the detected location information. Then, in step S5, the detected location information detected by the first area detecting circuit 23 is compared with the location information of the first area 2 previously stored in the processing memory 40. In step S6, it is judged whether or not the detected location information coincides with the location information of the first area 2. When the detected location information does not coincide with the location information of the first area 2 in step S6 (NO in step S6), the processing returns to step S2, and the above-mentioned processing is repeated in order to again detect the first area 2. On the other hand, when the detected location information coincides with the location information of the first area 2 in step S6 (YES in step S6), in step S7, as shown in FIG. 17, the servo control circuit 22 is controlled so as to trace the same track (the n-th track). In step S8, it is judged whether or not the same sector address ID(n) is detected. Until the same sector address ID(n) is detected, the processing of step S8 is repeated. When the same sector address ID(n) is detected in step S8, the flow goes to step S9 of FIG. 19.

In step S9 of FIG. 19, the servo control circuit 22 is controlled so that the optical head 18 jumps to an adjacent next track. At this time, at least the PLL circuit included in the analog processor 20 is held so as to prevent the PLL circuit from tracking, since the number of clocks is counted by the first area detecting circuit 23. In the present preferred embodiment, as shown in FIG. 17, whether or not the first area 2 is detected on the adjacent track, namely, the (n+1)-th track by the first area detecting circuit 23 is similarly checked or confirmed. The number of data (or the number of clocks) from the sector address ID(n) on the n-th track to the first area 2 on the n-th track detected by the first area detecting circuit 23 is substantially equal to the number of data (or the number of clocks) from the sector address ID(n) on the n-th track to the first area 2 on the adjacent track (detected by the first area detecting circuit 23). Thus, the numbers of data detected by the first area detecting circuit 23 must substantially coincide with each other. When both the detected numbers of data are substantially equal to each other, the system controller 25 judges that the detected area is the first area 2 formed by removing the reflecting film. Specific processing corresponds to the processing from step S10 to step S13.

Then, in step S10, the number of data (or the number of clocks) from the sector address ID(n) on the n-th track to the first area 2 on the n-th track is compared with the number of data (or the number of clocks) from the sector address ID(n) on the n-th track to the first area 2 on the adjacent (n+1)-th track. In step S11, it is judged whether or not the numbers of data substantially coincide with each other. In this case, the number of data may be counted or the number of clocks may be counted, because data corresponding to clock signals are present. A criterion of judgment as to whether or not the numbers of data substantially coincide with each other is determined in the following manner. Judgment is made that two types of the numbers of data substantially coincide with each other, as long as a difference between the numbers of data is within a few clocks such as 2 or 3 clocks (or a few pieces of data). When the answer is YES in step S11, in step S12, judgment is made that the detected area is the first area 2 formed by removing the reflecting film, and the processing for detecting and judging the first area is ended. On the other hand, when the answer is NO in step S11, in step S13, judgment is made that the detected area is not the first area 2, and the processing for detecting and judging the first area is ended.

The processing for detecting and judging the first area described with reference to FIGS. 18 and 19 utilizes the fact that a size of the first area 2 in the radial direction cannot be about the same as the size of a track pitch and, thus, the first area 2 extends over at least a plurality of tracks. In the present preferred embodiment, the system controller 25 makes the judgment by using the result of detection of the second area using the second area detecting circuit 24 as mentioned in the description of the second preferred embodiment, in addition to the processing for detecting and judging the first area. Thus, the system controller 25 judges whether or not information recorded on the optical disk is reproduced. Therefore, the system controller 25 can more accurately judge whether or not the optical disk is the authorized optical disk.

As described above, the first area 2 formed by removing the reflecting film is detected based on a sector, and is further detected based on the number of data or the number of clocks from a predetermined sector on an adjacent track thereof. Thus, an authorized optical disk can be easily discriminated from, for example, a pirated copy called an RF copy made by synchronously driving a reproducing system and a recording system, because both of the systems require very strict rotation accuracy or precision.

Modified Preferred Embodiments

In the above-described preferred embodiments, the optical disk reproducing apparatus comprises the first area detecting circuit 23 or 23a and the second area detecting circuit 24 or 24a. However, the invention is not limited to this. The optical disk reproducing apparatus may comprise either the first area detecting circuit or the second area detecting circuit.

Advantages Effects of Preferred Embodiments

As described in detail above, according to the invention, an optical disk, which is provided for recording data of a signal modulated according to a predetermined modulation method in a form of concavo-convex pits, comprises a first area having a reflecting film partly removed, and a second area for recording pits which are different from pits satisfying the requirements of the predetermined modulation method. Thus, a pirated optical disk is easily identified, and it can be judged whether or not information recorded on the optical disk is reproduced. Therefore, the right of a copyright owner can be certainly protected.

Moreover, the optical disk further comprises a first area location information recording area recording location information of the first area, and a second area location information recording area recording location information of the second area. Thus, the first area and the second area can be specified in accordance with the location information of the first area and the location information of the second area. Therefore, the first area and the second area can be more easily identified at high speed. Accordingly, the optical disk of the invention has a great practical merit.

Furthermore, the first area is again detected on an adjacent track to detect the first area formed by removing the reflecting film, and then, it is judged whether or not information recorded on the optical disk is reproduced. Therefore, the right of a copyright owner can be certainly protected, and measures to more solidly protect against a pirated copy can be provided.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for reproducing information recorded on an optical disk which is provided for recording data of a signal modulated according to a predetermined modulation method in a form of concavo-convex pits, said optical disk comprising a first area having a reflecting film partly removed, and a second area for recording pits which are different from pits satisfying requirements of said predetermined modulation method, said apparatus comprising:

a first area detecting circuit for detecting said first area in accordance with a reproduced signal from said optical disk upon reproducing information recorded in said first area, and outputting a first detecting signal;

a second area detecting circuit for detecting said second area in accordance with a reproduced signal from said optical disk upon reproducing information recorded in said second area, and outputting a second detecting signal; and judging means for judging whether or not the information recorded on said optical disk should be reproduced, in accordance with said first and second detecting signals, wherein said second area detecting circuit comprises:

a first comparator for comparing the reproduced signal from said optical disk upon reproducing information recorded in said second area, with a predetermined first threshold value, and outputting a first comparison result signal;

a second comparator for comparing the reproduced signal from said optical disk upon reproducing information recorded in said second area, with a predetermined second threshold value, and outputting a second comparison result signal; and an arithmetic logic circuit for performing a logic operation between said first comparison result signal and said second comparison result signal, and outputting a logic operation result signal, wherein said first area detecting circuit judges whether or not said first area is detected in accordance with whether or not a first number of data from a predetermined sector address to said detected first area, which is counted based on the reproduced signal from said optical disk upon reproducing information recorded on a track including said first area, substantially coincides with a second number of data from said predetermined sector address to said detected first area, which is counted based on a reproduced signal from said optical disk upon reproducing information recorded on a further track including said first area and adjacent to said track.

2. An apparatus for reproducing information recorded on an optical disk which is provided for recording data of a signal modulated according to a predetermined modulation method in a form of concavo-convex pits, said optical disk comprising a first area having a reflecting film partly removed, a second area for recording pits which are different from pits satisfying requirements of said predetermined modulation method, a first area location information recording area for recording location information of said first area on said optical disk, and a second area location information recording area for recording location information of said second area on said optical disk, said apparatus comprising:

a first detecting window generating circuit for generating a first detecting window signal in accordance with said location information of said first area on said optical disk recorded in said first area location information recording area;

a second detecting window generating circuit for generating a second detecting window signal in accordance with said location information of said second area on said optical disk recorded in said second area location information recording area;

a first area detecting circuit for detecting said first area in accordance with a reproduced signal from said optical disk upon reproducing information recorded in said first area, and outputting a first detecting signal;

a second area detecting circuit for detecting said second area in accordance with a reproduced signal from said optical disk upon reproducing information recorded in said second area, and outputting a second detecting signal; and judging means for judging whether or not the information recorded on said optical disk should be reproduced, in accordance with said first detecting signal in a valid time interval of said first detecting window signal, and said second detecting signal in a valid time interval of said second detecting window signal, wherein said second area detecting circuit comprises:
a first comparator for comparing the reproduced signal from said optical disk upon reproducing information recorded in said second area, with a predetermined first threshold value, and outputting a first comparison result signal;
a second comparator for comparing the reproduced signal from said optical disk upon reproducing information recorded in said second area, with a predetermined second threshold value, and outputting a second comparison result signal; and
an arithmetic logic circuit for performing a logic operation between said first comparison result signal and said second comparison result signal, and outputting a logic operation result signal, wherein said first area detecting circuit judges whether or not said first area is detected in accordance with whether or not a first number of data from a predetermined sector address to said detected first area, which is counted based on the reproduced signal from said optical disk upon reproducing information recorded on a track including said first area, substantially coincides with a second number of data from said predetermined sector address to said detected first area, which is counted based on a reproduced signal from said optical disk upon reproducing information recorded on a further track including said first area and adjacent to said track.

* * * * *